(12) United States Patent
Mihara et al.

(10) Patent No.: US 6,504,944 B2
(45) Date of Patent: *Jan. 7, 2003

(54) IMAGE RECOGNITION APPARATUS AND METHOD

(75) Inventors: Isao Mihara, Tokyo (JP); Miwako Doi, Kanagawa-ken (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/241,078

(22) Filed: Feb. 1, 1999

(65) Prior Publication Data

US 2002/0126879 A1 Sep. 12, 2002

(30) Foreign Application Priority Data

Jan. 30, 1998 (JP) .......................... 10-019871

(51) Int. Cl.⁷ .......................... G06K 9/00; G10L 15/00
(52) U.S. Cl. .......................... 382/118; 704/246
(58) Field of Search .................. 382/118, 203, 382/100, 190, 154, 173, 195, 206, 285; 704/231, 235, 248, 270, 238, 200, 246

(56) References Cited

U.S. PATENT DOCUMENTS

| | | | | |
|---|---|---|---|---|
| 4,260,229 A | * | 4/1981 | Bloomstein | 352/50 |
| 4,769,845 A | * | 9/1988 | Nakamura | 704/231 |
| 5,608,839 A | * | 3/1997 | Chen | 704/235 |
| 5,625,704 A | * | 4/1997 | Prasad | 382/118 |
| 5,715,325 A | * | 2/1998 | Bang et al. | 382/118 |
| 5,771,306 A | * | 6/1998 | Stork et al. | 382/100 |
| 5,835,616 A | * | 11/1998 | Lobo et al. | 382/118 |
| 5,884,257 A | * | 3/1999 | Mackawa et al. | 704/248 |
| 6,014,625 A | * | 1/2000 | Lee | 704/270 |
| 6,028,960 A | * | 2/2000 | Graf et al. | 382/203 |
| 6,072,903 A | * | 6/2000 | Maki et al. | 382/190 |

FOREIGN PATENT DOCUMENTS

JP          10-320588          12/1998

OTHER PUBLICATIONS

Yutaka Tanaka et al. (High–Speed Processing for Obtaining Three–Dimensional Distance Image and Its Application), IEEE, Nov. 1991.*

* cited by examiner

Primary Examiner—Jose L. Couso
Assistant Examiner—Kanji Patel
(74) Attorney, Agent, or Firm—Oblon, Spivak, McClelland, Maier & Neustadt, P.C.

(57) ABSTRACT

An image recognition apparatus and method in which an image capture device captures a distance image stream of an object body. A mouth portion extraction mechanism extracts a mouth portion from the distance image stream that has been extracted by the image capture device. An image recognition mechanism recognizes at least one of a lip shape and a lip movement based on a mouth portion distance image stream that has been extracted by the mouth portion extraction mechanism. Instructions for causing a computer to perform the method may be stored in a computer readable memory.

2 Claims, 21 Drawing Sheets

FIG. 6a

| -1 | 0 | 1 |
|---|---|---|
| -2 | 0 | 2 |
| -1 | 0 | 1 |

X-DIRECTION
SOBEL OPERATOR

FIG. 6b

| 1 | 2 | 1 |
|---|---|---|
| 0 | 0 | 0 |
| -1 | -2 | -1 |

Y-DIRECTION
SOBEL OPERATOR

IMAGE RECOGNITION APPARATUS AND METHOD

BACKGROUND OF THE INVENTION

1. Field of the Invention

The present invention relates to an image recognition apparatus and method for recognizing the shape and/or movement of an image based on a captured distance image.

2. Discussion of the Background

In recognizing a shape or a movement of the lips of a human or judging a direction, expression, or the like of the face of a human using image processing technology, first, the lips and their vicinity or a face portion of a human is imaged by using an imaging apparatus such as a CCD camera. Then, preprocessing is performed by cutting out only an object to be recognized such as only a lip portion or only a face portion from a resulting image by removing unnecessary portions such as the background. A shape or a movement is recognized by using an image obtained by the preprocessing.

In conventional preprocessing, an object is cut out by using, as a key, some difference between the object and the other portions. There are several methods that use, as a key, a variation in hue, a difference image, a marker or the like, or a chromakey.

However, an image that has been cut out by any of the above methods includes only two-dimensional information. Even if there are imaging apparatuses that acquire a three-dimensional shape, they are not suitable for real-time recognition such as recognition of a movement. There is another problem that the three-dimensional imaging apparatus is very expensive and cannot be used easily. For this reason, in the conventional image processing, a shape or movement of the face or lips of a human is recognized by using only two-dimensional information.

However, since a shape or a movement that is three-dimensional in nature is handled as two-dimensional information, it cannot be recognized accurately because necessary information is omitted and only a simple shape or movement can be recognized in spite of various measures taken.

As described above, conventionally, it is very difficult to accurately cut out only a desired object portion from an image obtained by a camera, and this is one factor which lowers the recognition rate of image recognition.

Since an image is captured as two-dimensional information by using a camera or the like, because of various limitations here is no other way than recognizing a three-dimensional shape or movement based on only two-dimensional information. This causes a problem that only a simple shape or movement can be recognized.

SUMMARY OF THE INVENTION

The present invention has been made in view of the above problems in the art, and an object of the invention is therefore to provide an image recognition apparatus and method which can recognize a shape or a movement of the face or lips of a human at high speed with high accuracy.

The above and other objects are achieved according to the present invention by providing a novel image recognition apparatus including an image capturing device which captures a distance image of an object; a mouth portion extracting mechanism configured to extract a mouth portion from the distance image captured by the image capturing device; and an image recognizing mechanism configured to recognize a lip shape based on a mouth portion distance image extracted by the mouth portion extracting mechanism.

According to a second aspect of the invention, there is provided an image recognition apparatus including an image capturing device which captures a distance image stream of an object; a mouth portion extracting mechanism configured to extract a mouth portion from the distance image stream captured by the image capturing device; and an image recognizing mechanism configured to recognize a lip movement based on a mouth portion distance image stream extracted by the mouth portion extracting mechanism.

According to a third aspect of the invention, there is provided an image recognition apparatus including an image capturing device which captures a distance image of an object; a face portion extracting mechanism configured to extract a face portion from the distance image captured by the image capturing device; and an image recognizing mechanism configured to recognize a face shape based on a face portion distance image extracted by the face portion extracting mechanism.

According to a fourth aspect of the invention, there is provided an image recognition apparatus including an image capturing device which captures a distance image stream of an object; a face portion extracting mechanism configured to extract a face portion from the distance image stream captured by the image capturing device; and an image stream captured distance image; and recognizing a lip shape based on an extracted mouth portion distance image.

According to a sixth aspect of the invention, there is provided an image recognition method including the steps of capturing a distance image stream of an object; extracting a mouth portion from the captured distance image stream; and recognizing a lip movement based on an extracted mouth portion distance image stream.

According to a seventh aspect of the invention, there is provided a computer-readable memory containing computers readable instructions, including a first instruction which causes a computer to capture a distance image of an object; a second instruction which causes the computer to extract a mouth portion from the captured distance image; and a third instruction which causes the computer to recognize a lip shape based on an extracted mouth portion distance image.

According to an eighth aspect of the invention, there is provided a computer-readable memory containing computer-readable instructions, including a first instruction which causes a computer to capture a distance image stream of an object; a second instruction which causes the computer to extract a mouth from the captured distance image stream; and a third instruction which causes the computer to recognize a lip movement based on an extracted mouth portion distance image stream.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 6A and 6B show Sobel operators used in the invention;

DETAILED DESCRIPTION OF THE PREFERRED EMBODIMENTS

Figure 1:
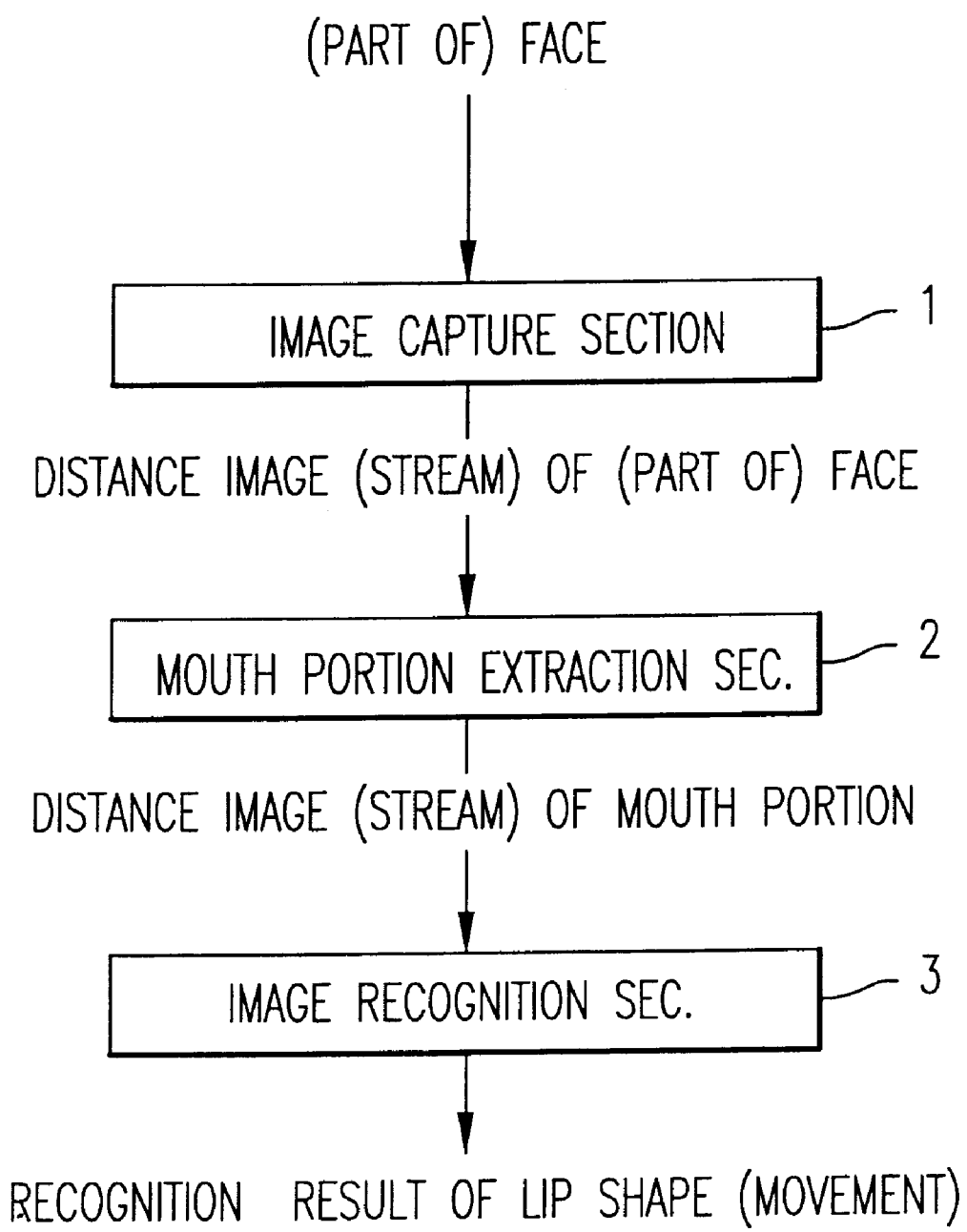
FIG. 1 is a block diagram of an image recognition apparatus according to a first embodiment of the present invention.

Referring now to the drawings, wherein like reference numerals refer to the same or corresponding parts throughout the several views, several embodiments of the present invention are next described.

FIRST EMBODIMENT

FIG. 1 shows the configuration of an image recognition apparatus according to a first embodiment of the present invention composed of an image capture section 1 which captures a distance image stream, a mouth portion extraction section 2 which extracts only a mouth portion from the distance image stream of all or part of a face captured by the image capture section 1, and an image recognition section 3 which recognizes a shape and/or a movement of lips based on the extracted mouth portion distance image stream.

The image capture section 1 captures, at predetermined time intervals (e.g., every 1/60sec), a distance image having a depth value that represents a three-dimensional shape of all or part of a human face as an image recognition object. The capture of a distance image can be performed according to the image capturing method disclosed in U.S. Application Ser. No. 08/935,667. The image capture section 1 generates a distance image by applying light to an object body, extracting a spatial intensity profile of reflection light coming from the object body, and converting intensity values of respective pixels to values indicating depth or distance. If a face is imaged by using the image capture section 1, a distance image stream of a moving image of all or part of the face can be obtained based on distance images. The details of the image capture section will be described later.

Figure 2:
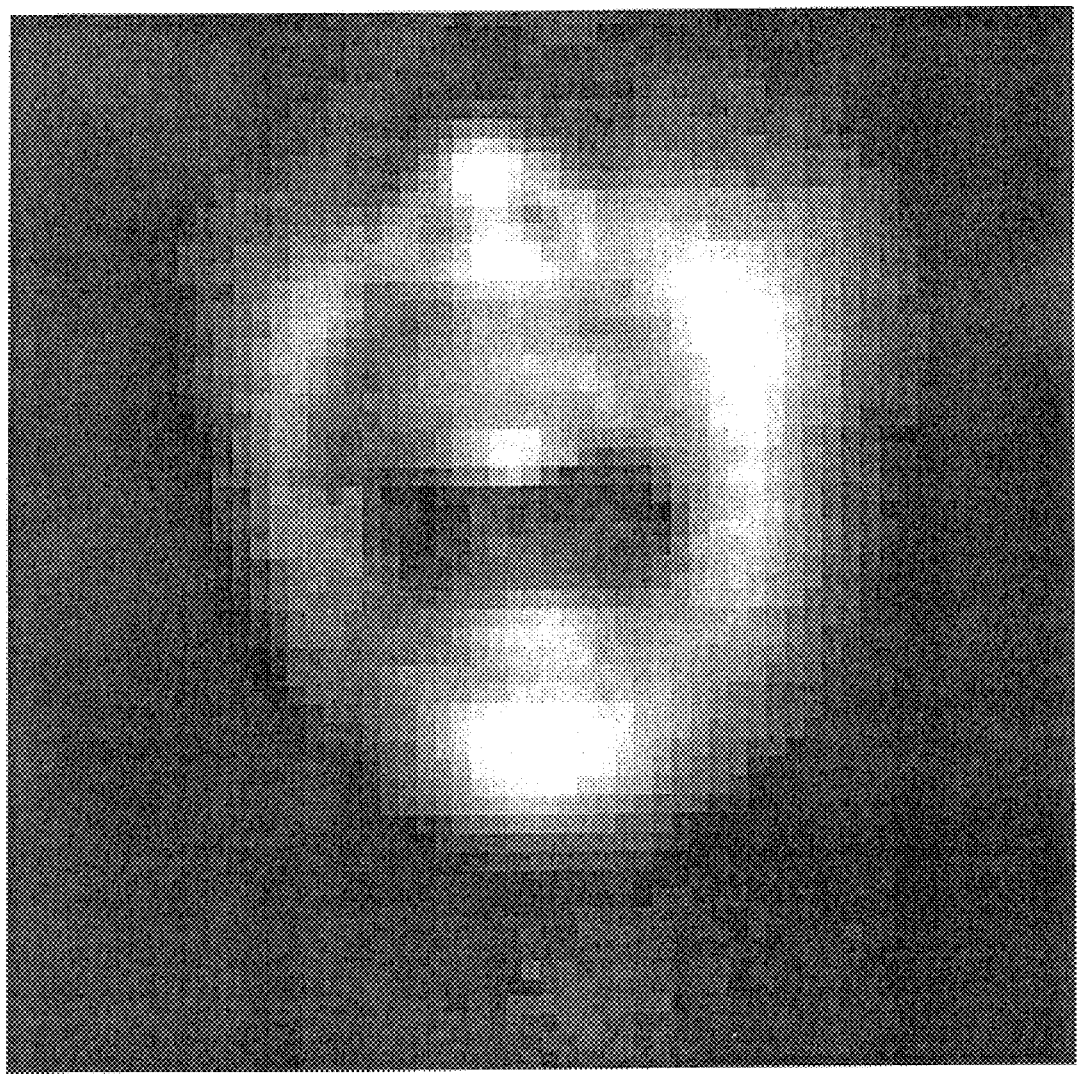
FIGS. 2–4 are illustrations of examples of distance images produced according to the invention.

FIG. 2 shows an example of one frame of a distance image stream of a face captured by the image capture section 1. In this embodiment, a distance image is a three-dimensional image having depth information that consists of 64 pixels in each of the x-axis and y-axis directions and has 256 gradation levels in the z-direction. In FIG. 2, the gradation in the z-axis direction (i.e., the distance value direction of the distance image) is expressed in gray scale. In a distance image, a color that is closer to white means that the distance between a body and the image capture section 1 is shorter, and a color that is closer to black means that the distance is longer. A completely black portion means that it has no image or that even if an image exists, the body is too far and hence the image is regarded as non-existent. For example, in FIG. 2, a lip portion is white and a mouth portion inside the lip portion is black.

A photodetecting surface or a chassis accommodating it of the image capture section 1 may be disposed properly so as to meet the purpose of the image recognition apparatus. For example, where the image recognition apparatus has a display device, the chassis of the image recognition apparatus is so disposed that the face of a human is squarely opposed to the photodetecting surface when it is squarely opposed to the display device.

Next, the mouth portion extraction section 2 will be described.

The mouth portion extraction section 2 extracts a mouth portion from all or part of a distance image stream that has been captured by the image capture section 1.

As for the lips and their vicinity of a human as viewed three-dimensionally, their local shapes vary from one person to another and they vary depending on the situation even if they are of the same person. However, in general, the lip portion of a human has a feature that it is somewhat convex and the mouth portion inside the lip portion is large and concave.

Figure 3:
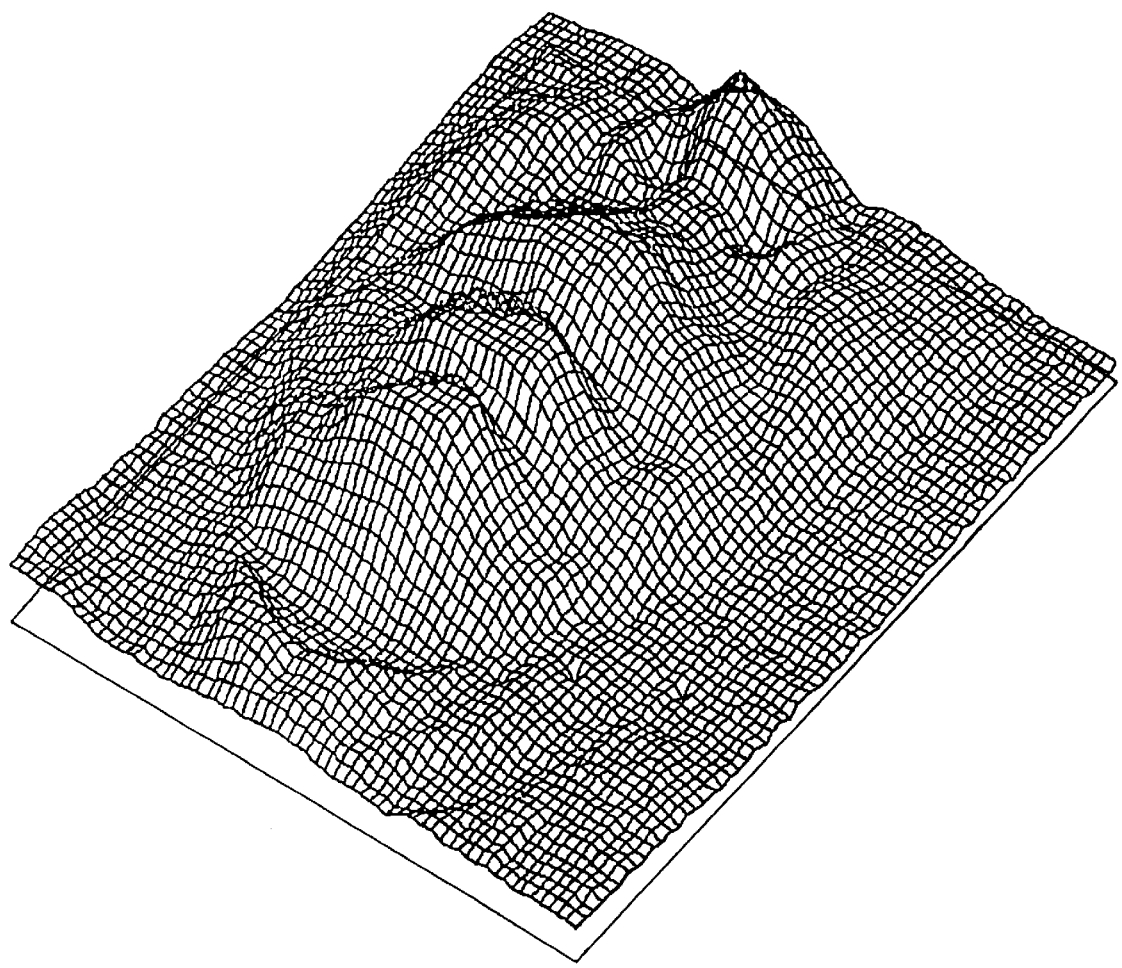
Figure 4:
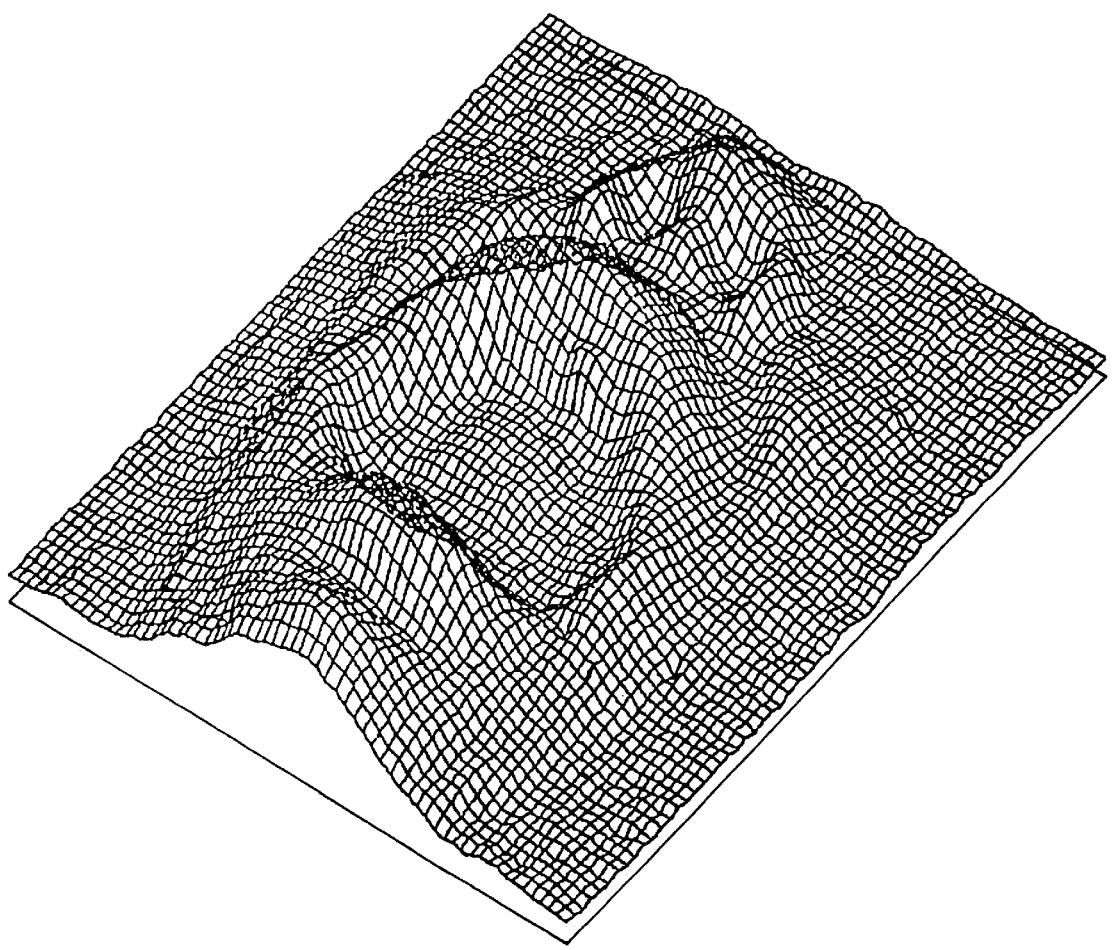

FIGS. 3 and 4 show stereoscopically a distance image of a face in which the lips are closed and a distance image of a face in which the lips are opened, respectively. The above-mentioned three-dimensional features of the mouth portion are found in FIGS. 3 and 4.

By utilizing the features of the three-dimensional shape of the mouth portion, a distance image stream in which only a mouth portion is extracted can be constructed based on a distance image stream of a face.

A specific description will be made below as to how to extract a mouth portion in the mouth portion extraction section 2.

An original image of a distance image captured by the image capture section 1 represents a three-dimensional shape of a face. It is possible to know how the gradient varies in the original image by determining a second derivative image of the distance image. By using the second derivative image, edge portions in the original image can be extracted. The term "edge" means a portion where the gradient varies, such as a boundary between a face and the background or a boundary between lips and a skin around them.

Figure 5:
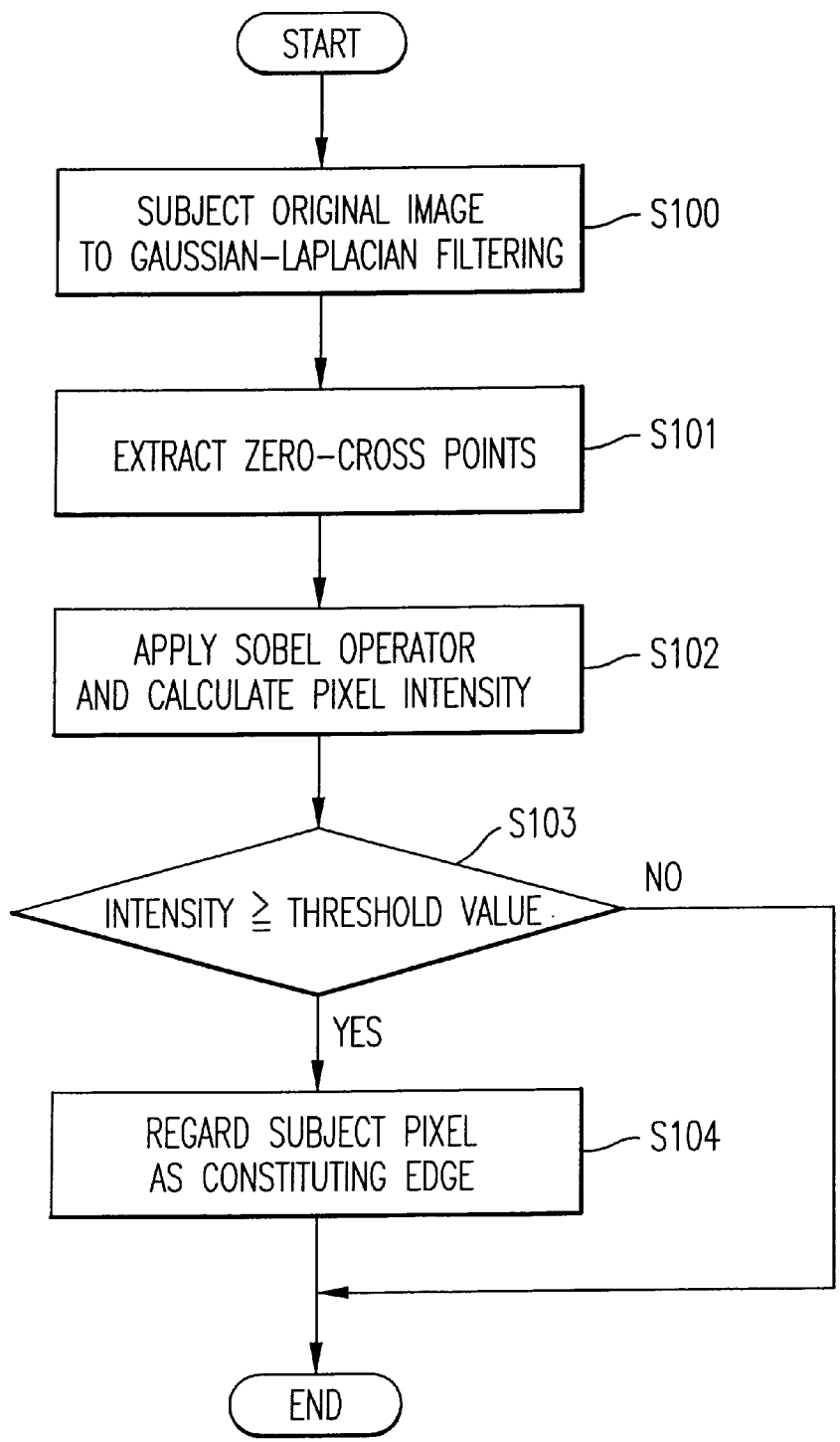
FIG. 5 is a flowchart showing an edge detection process according to the invention.

FIG. 5 shows an example flow of a specific process of edge detection.

First, an original image is subjected to Gaussian-Laplacian filtering that was proposed by Marr and Hildreth (step S100). Then, zero-cross points in a resulting image are extracted (step S101). For example, a subject pixel whose four adjacent pixels have positive values may be employed as a zero-cross point.

If the subject pixel is a zero-cross point, a Sobel operator as shown in FIGS. 6A and 6B is applied to it and its intensity is determined (step S102). FIGS. 6A and 6B show Sobel operators in the x-direction and y-direction, respectively. If an intensity value thus determined is larger than a certain threshold value, the subject pixel is regarded as a point constituting an edge (step S103).

Only edge portions can be extracted from the original image by executing the process of FIG. 5.

Although the above described method uses the Gaussian-Laplacian filtering and the Sobel operator, other methods such as those using the Hough transform may be used also.

Only edge portions can be extracted from the distance image of the face by subjecting it to the above process. Only edges of a mouth portion are extracted by using the above edge information and information on the shape of lips, for example, "the biggest one among looplike edges."

As a result of execution of the above process, a distance image stream of only the mouth portion can be acquired from the distance image stream of the face.

Although the method utilizing gradient variations has been described above, the method of extracting a mouth portion from a distance image of a face is not so limited. For example, a mouth portion may be extracted by setting a threshold value based on a geometrical feature that z values (depth) of the mouth portion should be smaller than a certain value because the mouth portion is a cavity. Alternatively, a mouth portion may be extracted by preparing, in advance, a template in which z values (depth) are smaller than a certain value and performing pattern matching with the template. As a further alternative, a mouth portion may be extracted by filtering using a band-pass filter based on distance information. Still further, a mouth portion may be extracted by using other three-dimensional shapes.

Next, the image recognition section 3 will be described. The image recognition section 3 recognizes a shape and/or a movement of lips based on a distance image stream of a mouth portion that has been extracted by the mouth portion extraction section 2.

First, a description will be made of how to recognize a shape of lips. In the image recognition section 3, templates of shapes corresponding to phonetic symbols [e], [i], etc, are prepared in advance. The mouth shape obtained by the mouth portion extraction section 2 is compared with the templates and a shape having the highest degree of similarity is employed as a recognition result.

Figure 7:
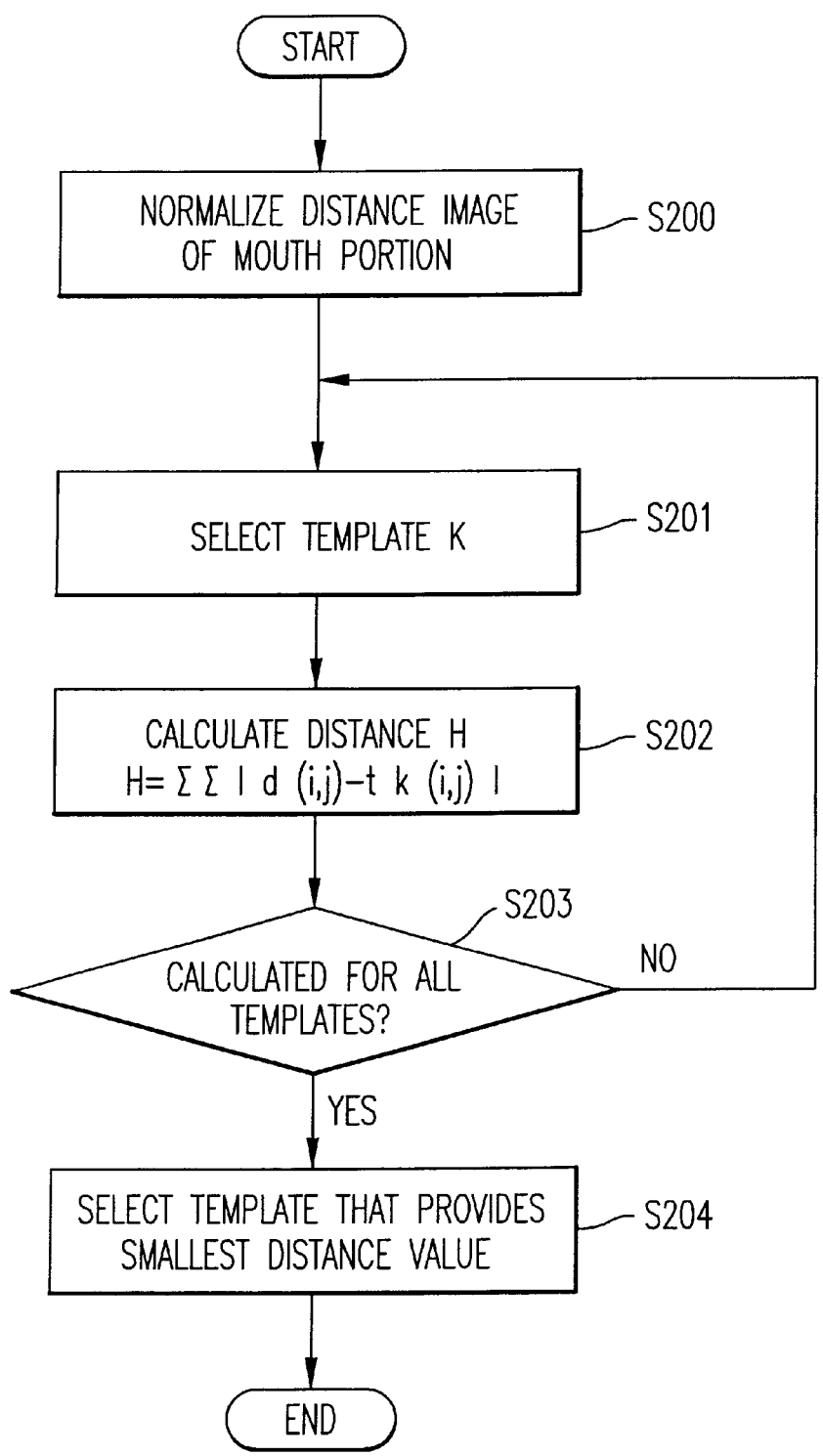
FIG. 7 is a flowchart showing a template matching process according to the invention.

FIG. 7 shows an example flow of a template matching process in the image recognition section 3. First, an original distance image of a mouth portion extracted by the mouth portion extraction section 2 is normalized in accordance with the direction and the size of templates (step S200).

Then, template k to be compared with the original image is selected from various templates prepared (step S201).

Then, a Hamming distance between the original image and template k is calculated (step S202). For example, the Hamming distance H is defined as $$\sum_i \sum_j |d(i,j) - tk(i,j)|$$

where i and j are x and y coordinates of each pixel, d(i,j) is a distance value at the coordinates (i,j) of the original image, and tk(i,j) is a distance value at the coordinates (i,j) of template k.

The method is not limited to calculating a Hamming distance and other calculation formulae may be used.

To cause the above steps to be executed for all the templates, it is judged whether the calculation of a Hamming distance H has been finished for all the templates (step S203).

If there remains a template for which a Hamming distance H has not yet been calculated, the process returns to step S201.

If Hamming distances H between the original image and all the templates have been calculated, they are compared with each other to find a template that provides the smallest Hamming distance H. The content expressed by the template thus selected is employed as a recognition result (step S204). For example, if the selected template is one corresponding to a mouth shape that occurs in pronouncing [e], the original distance image is recognized as a state that [e] is being pronounced.

A speech content of a speaker is recognized by sequentially executing the above process for all distance images of the distance image stream.

For distinction from speech recognition, recognition of a speech content of a speaker based on lip shapes will be called "lip recognition" in the following description. Lip recognition includes recognition that is performed based on distance images that are obtained when a person as a recognition object moves, without making any actual sound, his lips in the same manner as he so speaks.

Next, a description will be made of how to recognize a movement of lips. In the case of recognizing a movement of lips, plural series of templates each of which represents a movement such as "opening and closing of a mouth" or "yawn" are prepared in advance. Each series of templates is formed in such a manner that a movement is divided into frames and then the respective frames are associated with templates, which are a series of templates corresponding to the movement.

Lip recognition of a movement is performed by sequentially subjecting all distance images of a distance image stream to template matching with those series of templates.

Although in the above description the degree of similarity between an original image and a template is calculated by determining a Hamming distance therebetween, the method of calculating the degree of similarity is no so limited. For example, the degree of similarity may be calculated by the DP matching method, the KL conversion method, or a method of Fourier-converting an original image and then determining a correlation between a Fourier-converted image and a template.

Although the above description is directed to the case of performing template matching as the method of recognizing a shape or a movement of lips based on a distance image stream of a mouth portion, the invention is not limited to such a case. For example, it may be recognized by determining movements of muscles from a shape of lips and inferring a pronunciation content according to a muscle model.

Because of the use of distance images of lips, this embodiment makes it possible to extract a mouth portion easily at a low calculation cost. Further, as for the lip recognition, because of the use of three-dimensional information of an extracted lip portion, this embodiment makes it possible to recognize shapes that are hard for the conventional methods to distinguish from each other.

A recognition result of a lip shape, a recognition result of a lip movement, or a recognition result of a combination of a lip shape and a lip movement that is obtained in the above-described manner can be used in various kinds of processing that will be performed later. A design item of whether both or one of the functions of lip shape recognition and lip movement recognition should be provided in the image recognition section 3 can be determined properly in accordance with the purpose etc. of a system.

Various modifications of the above embodiment are possible, several examples of which will be described below.

FIRST MODIFICATION OF FIRST EMBODIMENT

The lip portion extraction section 2 may be replaced by a face portion extraction section for extracting only a face portion from a distance image stream captured by the image capture section 1.

Templates of face shapes of respective persons such as Mr. A and Mr. B are prepared in advance in the image recognition section 3. The identity of the person being imaged by the image recognition apparatus of this modification can be recognized by performing, using the face shape templates, matching with distance images of a face portion that have been extracted by the face portion extraction section.

For example, the thus-configured image recognition apparatus of this modification can be used for a simple security check where the image recognition apparatus is installed in the vicinity of an automatic door and an attempt is made to recognize the face of each person who wants to pass through the door, whereby the door is opened only when a person in front of the door is recognized as one of particular persons.

SECOND MODIFICATION OF FIRST EMBODIMENT

The first embodiment when applied as a medical instrument is effective in nursing a sick or elderly person. Conventionally, some abnormality happens to a person who is in a hospital room or in a nursing home, and the person then informs a nurse or a doctor of the occurrence of the abnormality by using a push-button buzzer that is provided by his pillow. However, the use of a push-button buzzer is unreliable because a seriously sick or elderly person may not be able to push it. If the image recognition apparatus of the first embodiment is installed at such a location, it becomes possible to recognize that the person wants to say something based on his faint voice and a subtle movement of his lips even when he cannot speak in a loud voice.

A movement of lips of a sick or elderly person who usually does not move his lips possibly means a sudden change in his condition. An example of a measure for such a case may be such that a movement of lips is converted to a sound which is used as an alarm sound, to allow a doctor or a nurse to hasten to the hospital or nursing home room of the person.

Figure 8:
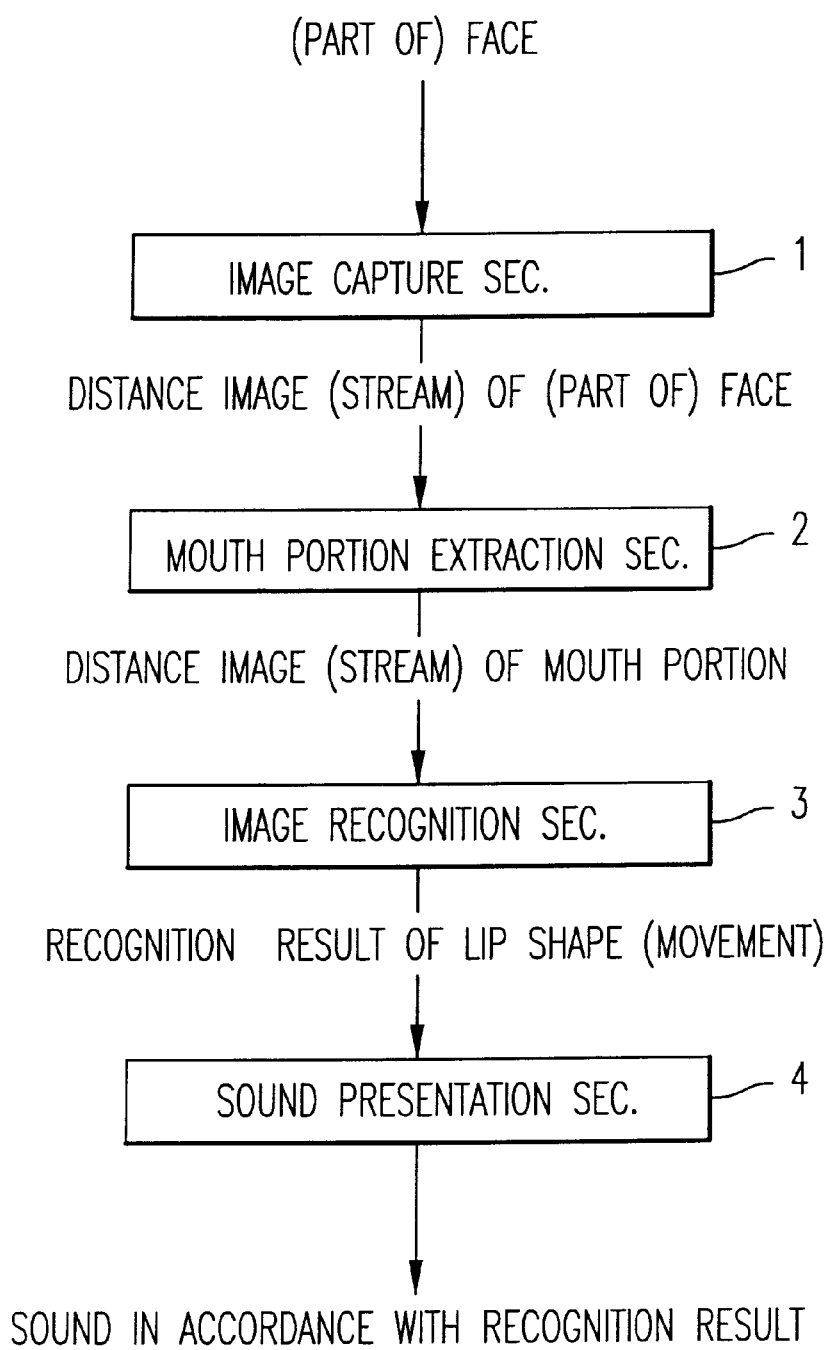
FIG. 8 is a block diagram of an image recognition apparatus according to a modification of the first embodiment of the invention.

In this case, as shown in FIG. 8, a sound presentation section 4 is provided that presents a sound obtained by directly converting a result of lip recognition or presents some sound in accordance with a result of lip recognition.

THIRD MODIFICATION OF FIRST EMBODIMENT

Figure 9:
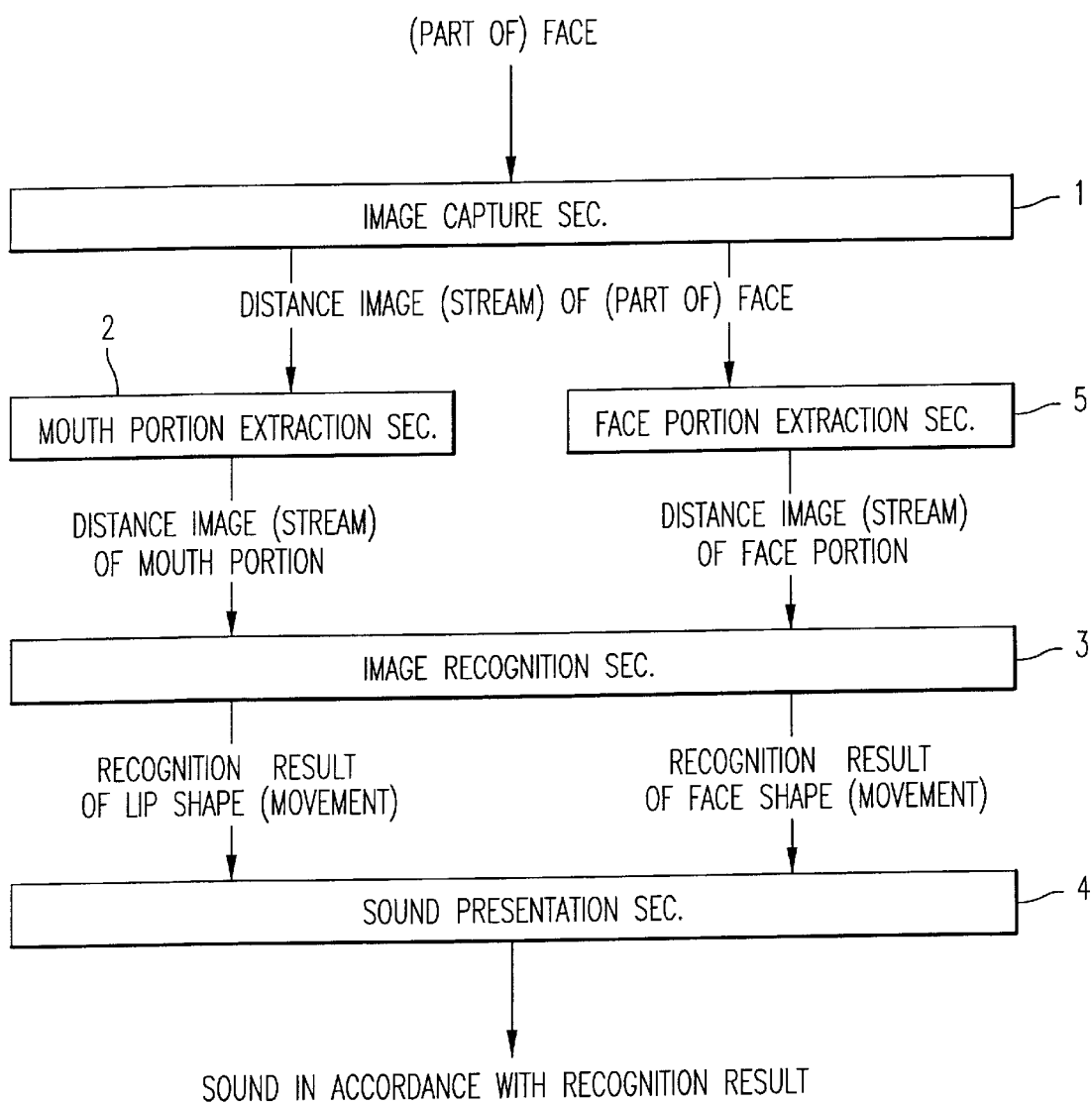
FIG. 9 is a block diagram of an image recognition apparatus according to another modification of the first embodiment of the invention.

In this modification, as shown in FIG. 9, a face portion extraction section 5 for extracting a distance image stream of only a face portion is added to the configuration of the second modification of the first embodiment shown in FIG. 8. The use of three-dimensional information of a face portion extracted by the face portion extraction section 5 enables recognition of, for example, a facial gesture such as vertical shaking of a face or an expression such as a smile, an angry look, or a distressed look.

In this case, templates are prepared in advance in the image recognition section 3. For example, the templates are ones for recognition of gestures and expressions such as nods (several vertical shakes of a face), a refusal (several horizontal shakes of a face), joy (widely opening a mouth and narrowing eyes), and surprise (widely opening eyes). A gesture or an expression of a face is recognized by performing template matching using such gesture and expression templates.

In converting a lip movement to a voice, the kind or the pitch of a converted voice can be changed in accordance with a recognized gesture or expression.

Even for the same lip movement, a converted sound may be changed in such a manner that a bark of a dog, cackle of a chicken, and a mew of a cat are used for affirmation, negation, and joy, respectively. For example, this allows children to learn pronunciation of words pleasantly without becoming tired.

SECOND EMBODIMENT

A second embodiment of the invention is next described. The description of this embodiment will be centered on differences from the first embodiment.

Figure 10:
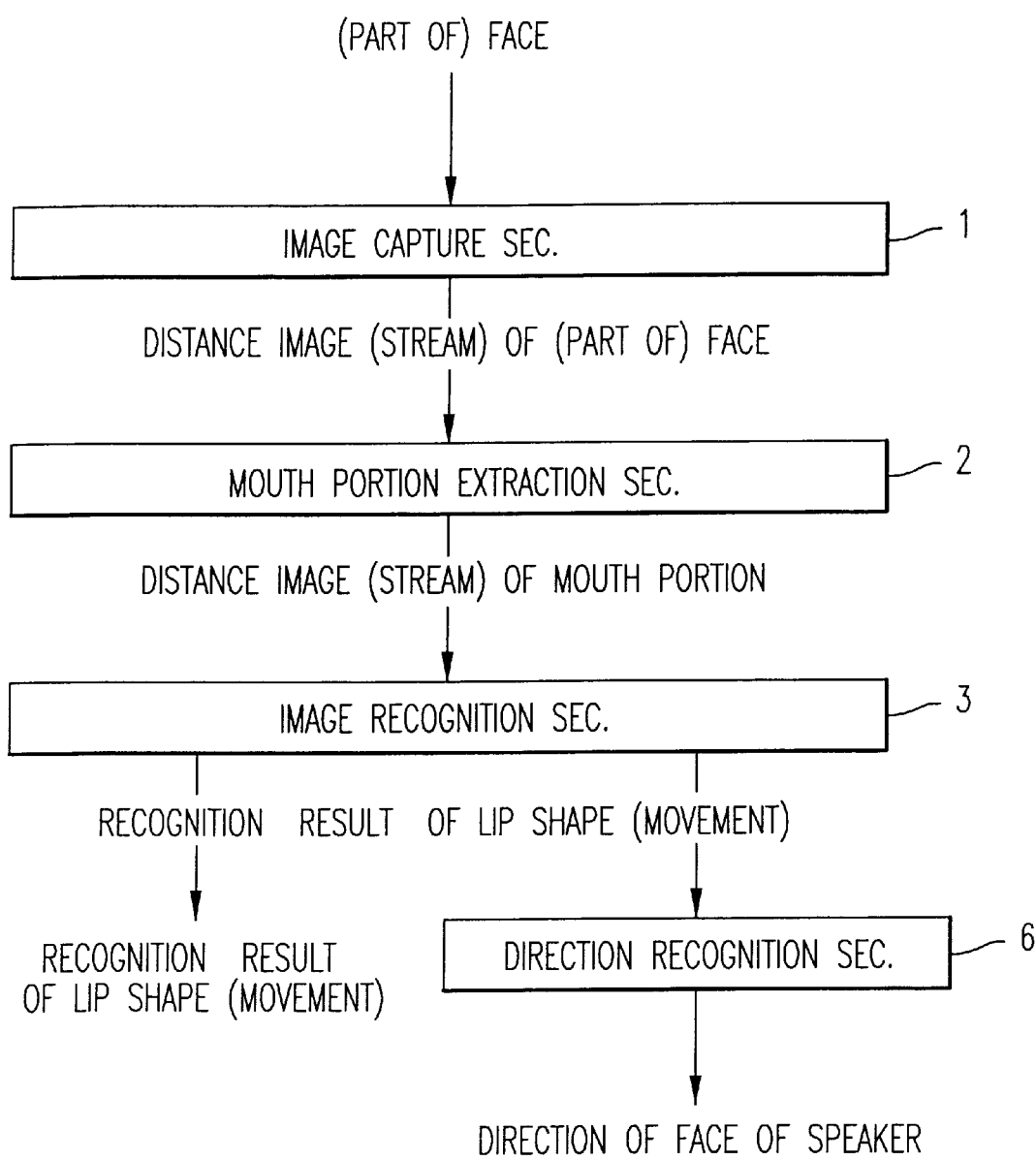
FIG. 10 is a block diagram of an image recognition apparatus according to a second embodiment of the invention.

FIG. 10 shows the configuration of an image recognition apparatus according to this embodiment. As shown in FIG. 10, in the image recognition apparatus of this embodiment, a direction recognition section 6 for recognizing a direction of the face of a speaker based on a lip shape or movement obtained by the image recognition section 3 is added to the configuration of the image recognition apparatus of the first embodiment. This allows recognition of not only a speech content of a speaker but also a direction to which he is speaking.

The direction recognition section 6 recognizes a direction of the face of a speaker based on a lip shape or movement obtained by the image recognition section 3. To this end, the direction recognition section 6 calculates a direction of the face of a speaker by using a three-dimensional shape of lips.

Figure 11:
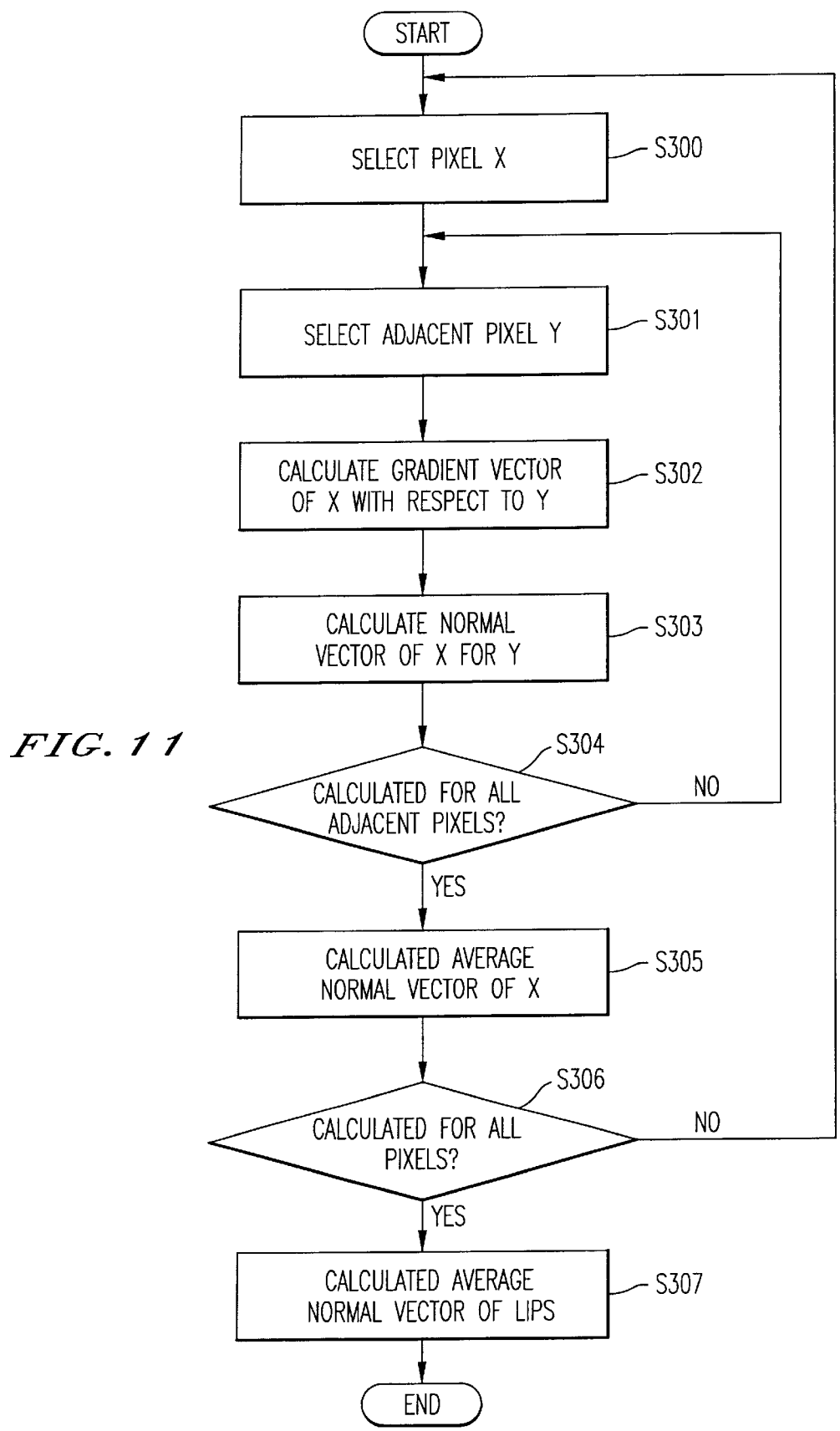
FIG. 11 is a flowchart showing a process of determining a direction of the face of a speaker according to the invention.

An example of a specific method of determining a direction of the face of a speaker will be described below with reference to a process flowchart of FIG. 11.

First, pixel X (having coordinates (i,j), for example) in a distance image of lips is selected (step S300).

Figure 12A:
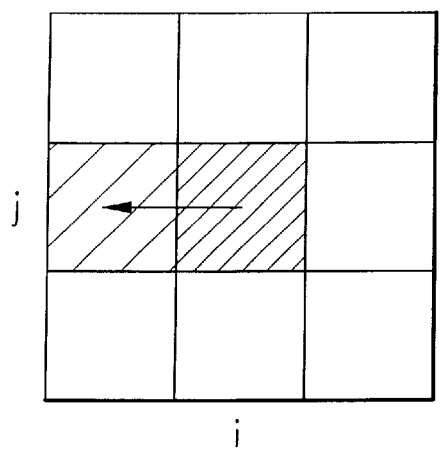
FIGS. 12A and 12B are illustrations of the normal direction of a pixel in the invention.

Then, pixel Y (having coordinates (i-1,j), for instance) adjacent to pixel X is selected (step S301). FIG. 12A shows eight pixels adjacent to pixel X, and FIG. 12B shows a gradient vector g and a normal vector p that is perpendicular to the gradient vector g.

Figure 12B:
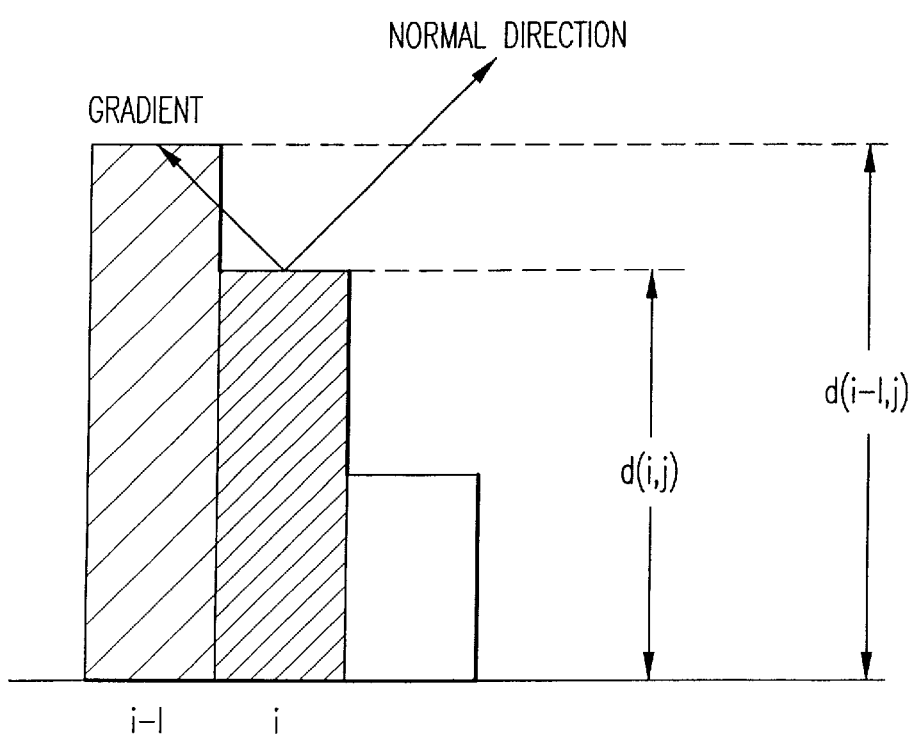

Then, as shown in FIG. 12B, the direction recognition section 6 determines a gradient vector g between pixel X and the selected pixel Y (having coordinates (i-1,j), for instance) based on a difference between their distance values, d(i,j)–d(i-1,j) (step S302).

Then, a normal vector p that is included in the same plane as the two pixels X and Y and perpendicular to the gradient vector g that has been obtained at step S302 is determined (step S303).

Then, it is judged whether the calculation of a normal vector has been completed for all pixels Y that are adjacent to pixel X (step S304).

If a judgment result at step S304 is negative, the process returns to step S301. If the judgment result at step S304 is affirmative, an average P of normal vectors p adjacent to pixel X is calculated according to P=Σp and employed as a normal vector P of pixel X (step S305).

Then, it is judged whether the above steps have been executed for all pixels in the distance image (step S306). If a judgment result is negative, the process returns to step S300.

Finally, when the calculation of a normal vector P has been finished for all pixels, the direction recognition section 6 calculates an average $P_{lip}$=ΣP of normal vectors P of the respective pixels and employs it as a normal vector of lips (step S307).

Since lips are located approximately at the center of a face and approximately symmetrical with respective to the horizontal and vertical center lines, the normal vector of the lips approximately coincides with that of the face. Therefore, the vector $P_{lip}$ obtained at step S307 can be regarded as a normal vector of the face. That is, the normal direction Plip (face direction) can be recognized as a direction to which the speaker is speaking.

Although the method of calculating a normal vector of lips based on a distance image has been described above as one means for determining a direction of the lips, the invention is not limited to such a case. A normal vector may be calculated by other methods such as inferring a direction of lips based on size ratios of lips or variations in lip shape.

As described above, this embodiment makes it possible to simultaneously recognize which direction a speaker is speaking to, and what he is speaking or how his lips are moving.

Various modifications of the above embodiment are possible, several examples of which will be described below.

FIRST MODIFICATION OF SECOND EMBODIMENT

Figure 13:
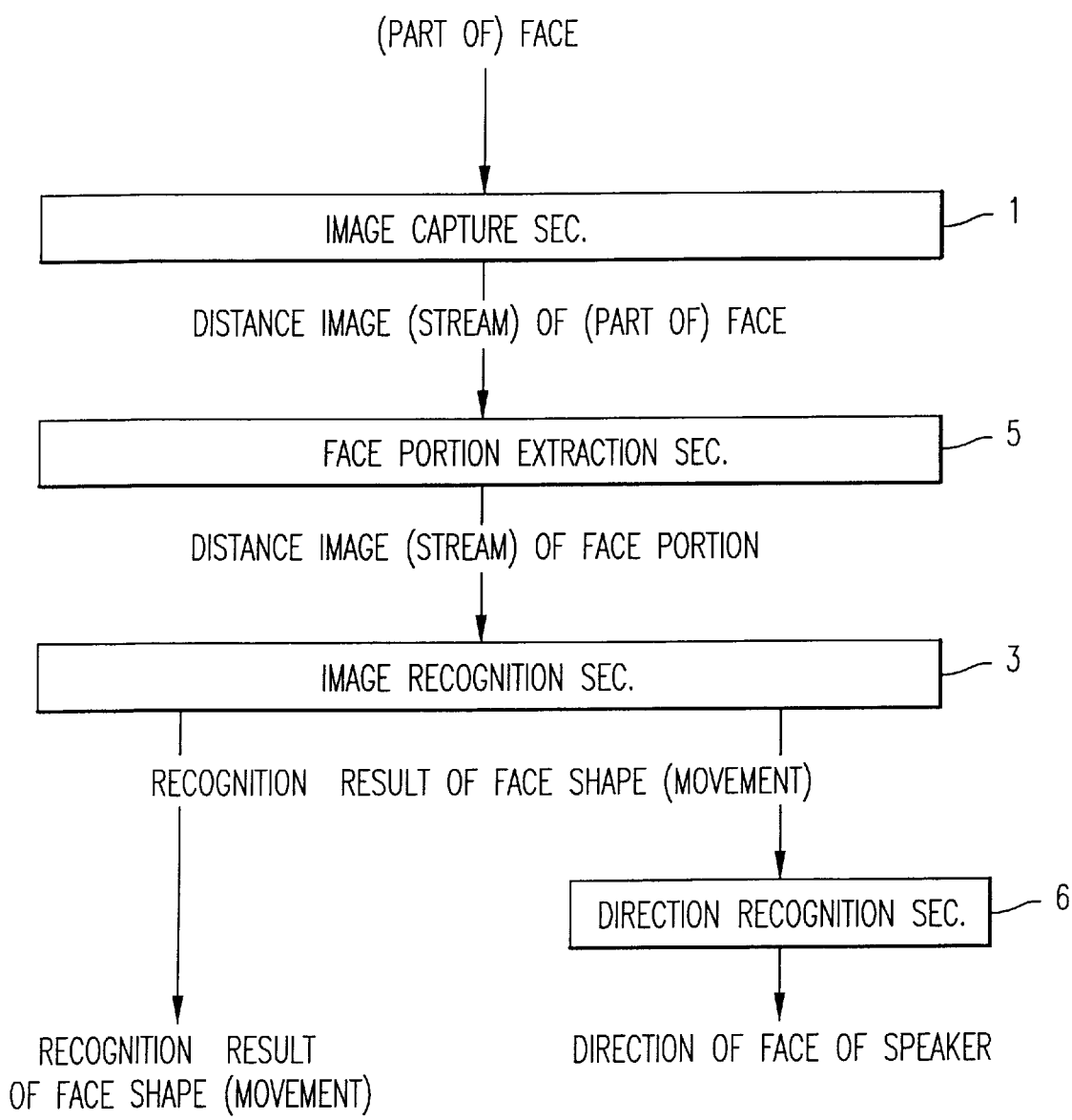
FIG. 13 is a block diagram of an image recognition apparatus according to a modification of the second embodiment of the invention.

As shown in FIG. 13, the mouth portion extraction section 2 may be replaced by a face portion extraction section 5 for extracting only a face portion from a distance image stream captured by the image capture section 1. In this case, a distance image stream of a face portion extracted by the face portion extraction section 5 is input to the image recognition section 3.

Templates are prepared in advance in the image recognition section 3, for example, for recognition of gestures and expressions such as nods (several vertical shakes of a face), a refusal (several horizontal shakes of a face), joy (widely opening a mouth and narrowing eyes), and surprise (widely opening eyes). By performing template matching with the input distance image stream of a face by using such templates, the image recognition section 3 can recognize a gesture such as nods or an expression such as joy, surprise, or distress.

The direction recognition section 6 recognizes a direction of the face of a speaker based on a shape or a movement of a face portion obtained by the image recognition section 3.

This modification makes it possible to recognize what action an object person is doing with his face directed to which direction.

SECOND MODIFICATION OF SECOND EMBODIMENT

Figure 14:
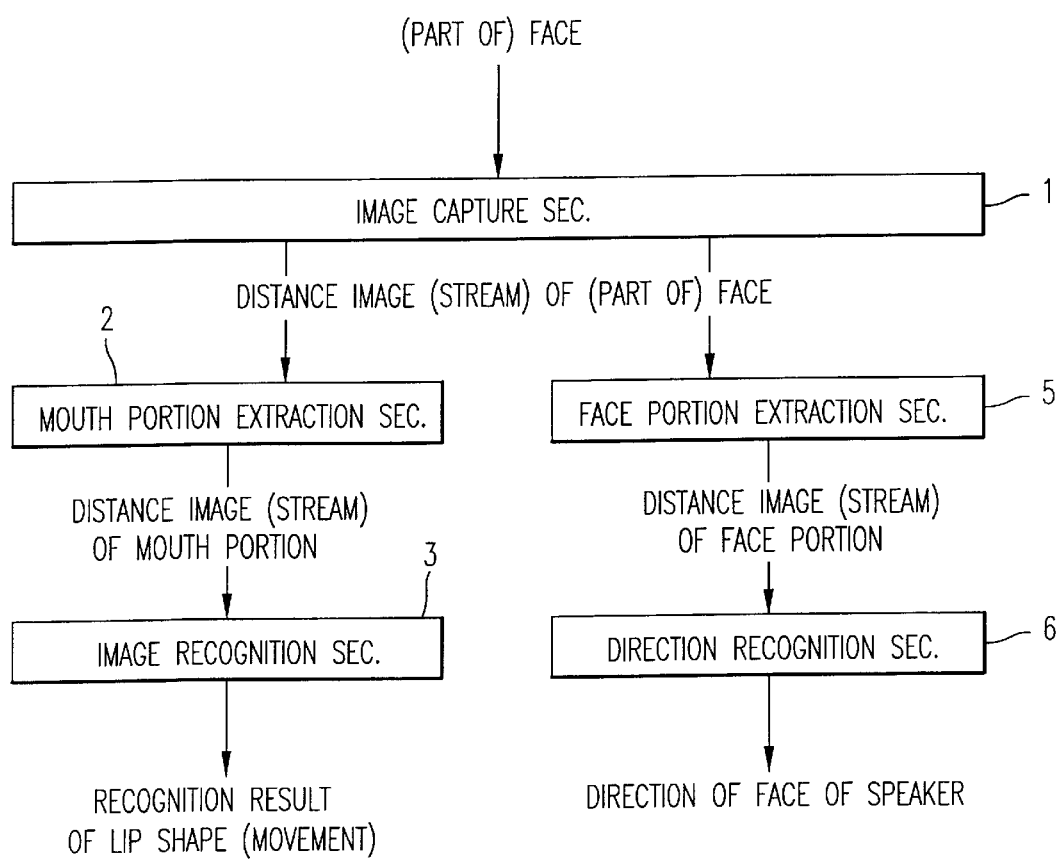
FIG. 14 is a block diagram of an image recognition apparatus according to another modification of the second embodiment of the invention.

In this modification, as shown in FIG. 14, a face portion extraction section 5 for extracting only a face portion from a distance image stream including the background or the like that has been captured by the image capture section 1 is newly added. A direction to which a speaker is speaking may be recognized by the direction recognition section 6 based on a distance image stream of a face that has been extracted by the face portion extraction section 5. In this case, the direction recognition section 6 recognizes a direction to which a speaker is speaking by, for example, calculating a normal direction of a face such as an average of normal directions of the respective pixels that constitute the face based on the distance image stream that has been extracted by the face portion extraction section 5.

While in the second embodiment a direction of lips is employed as a direction of a face, in this modification a direction of a face can be obtained directly. Therefore, this modification enables recognition of slight or subtle differences in the direction of a face.

EMBODIMENT 3

A third embodiment of the invention will be hereinafter described. The description of this embodiment will be centered on differences from the second embodiment.

Figure 15:
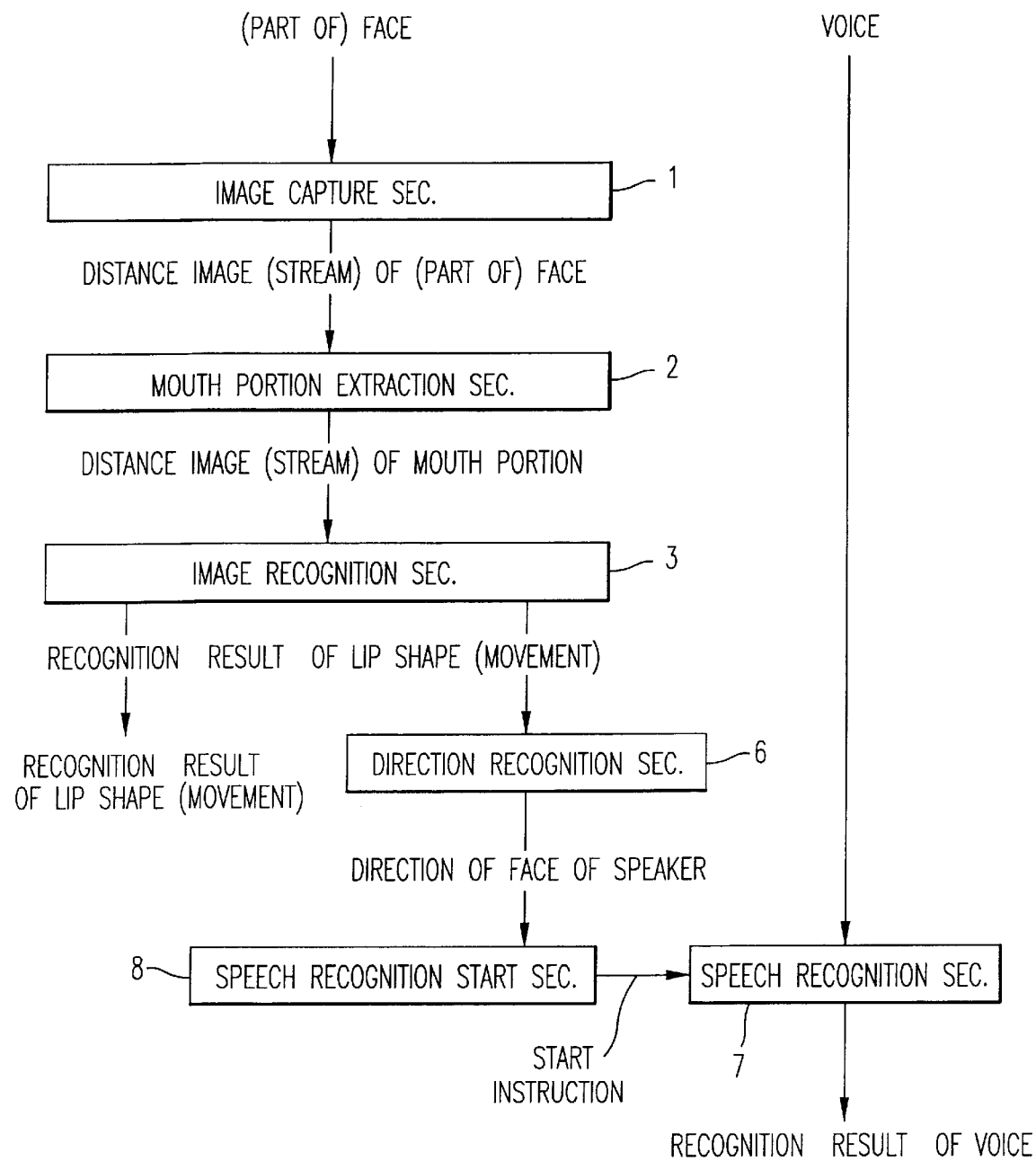
FIG. 15 is a block diagram of an image recognition apparatus according to a third embodiment of the invention.

FIG. 15 shows the configuration of an image recognition apparatus according to this embodiment. As shown in FIG. 15, in the image recognition apparatus of this embodiment, a speech recognition section 7 for recognizing a speech content of a speaker and a speech recognition start section 8 for instructing the speech recognition section 7 to start speech recognition based on a direction of the face of the speaker that is recognized by the direction recognition section 6, are added to the image recognition apparatus of the second embodiment or either of its modifications. This makes it possible to perform speech recognition in accordance with the direction of the face of a speaker.

First, the speech recognition section 7 will be described. The speech recognition section 7 recognizes the content of a voice that is input through a voice input device such as a microphone. Various recognition methods may be used in the speech recognition section 7. For example, the speech recognition section 7 may be implemented by using the hidden Markov model or the like. The speech recognition enables recognition of a speech content of a speaker Next, the speech recognition start section 8 will be described. The speech recognition start section 8 instructs, based on a recognition result of the direction recognition section 6, the speech recognition section 7 to start speech recognition. For example, the speech recognition start section 8 judges that an action of a speaker has started when he has faced squarely a photodetecting device portion of the image capture section 1 of the image recognition apparatus, and sends, at this time point, an instruction to start speech recognition to the speech recognition section 7.

As described above, this embodiment makes it possible to start speech recognition in response to an action of a speaker. For example, speech recognition can be started when a speaker has turned to squarely face the image recognition apparatus.

In the invention, a result of lip recognition by the image recognition section 3 can also be obtained; that is, speech recognition and lip recognition can be performed simultaneously.

A speech content of a speaker can be recognized by using results of these two kinds of recognition.

This is very effective in the following situations. For example, at a location such as a construction site where a voice is hard to hear owing to large noise on site, if only the speech recognition is used, the recognition rate decreases and there may occur a case that a voice cannot be recognized at all. Even in such a situation, if the lip recognition is also performed as in the case of the third embodiment, the recognition rate does not decrease because the lip recognition is not affected by on site noise. This makes it possible to maintain a high overall recognition rate. Similarly, in a place such as a library where a loud voice is not permitted, if only the speech recognition is used, the recognition rate may decrease because recognition of a faint voice is needed. Even in such a situation, if the lip recognition is also performed as in the case of the third embodiment, the total recognition rate can again be kept high for the same reason.

In a situation where two persons converse with each other, it is difficult for the conventional speech recognition techniques to discriminate between the two recognition objects because a plurality of voices are input simultaneously. In contracts, in this embodiment, one recognition object can easily be discriminated from the other by, for example, recognizing only one of the two persons who squarely faces the image recognition apparatus of this embodiment. Further, since the lip recognition is performed simultaneously, the recognition objects can be discriminated from each other by using information obtained by the lip recognition.

Various modifications of the above embodiment are possible, several examples of which will be described below.

FIRST MODIFICATION OF THIRD EMBODIMENT

Although the third embodiment is directed to the case where the speech recognition section 7 and the speech recognition start section 8 are provided and speech recognition is started based on a recognition result of the direction recognition section 6, the invention is not limited to such a case and any recognizing means other than the speech recognition may be used.

SECOND MODIFICATION OF THIRD EMBODIMENT

Figure 16:
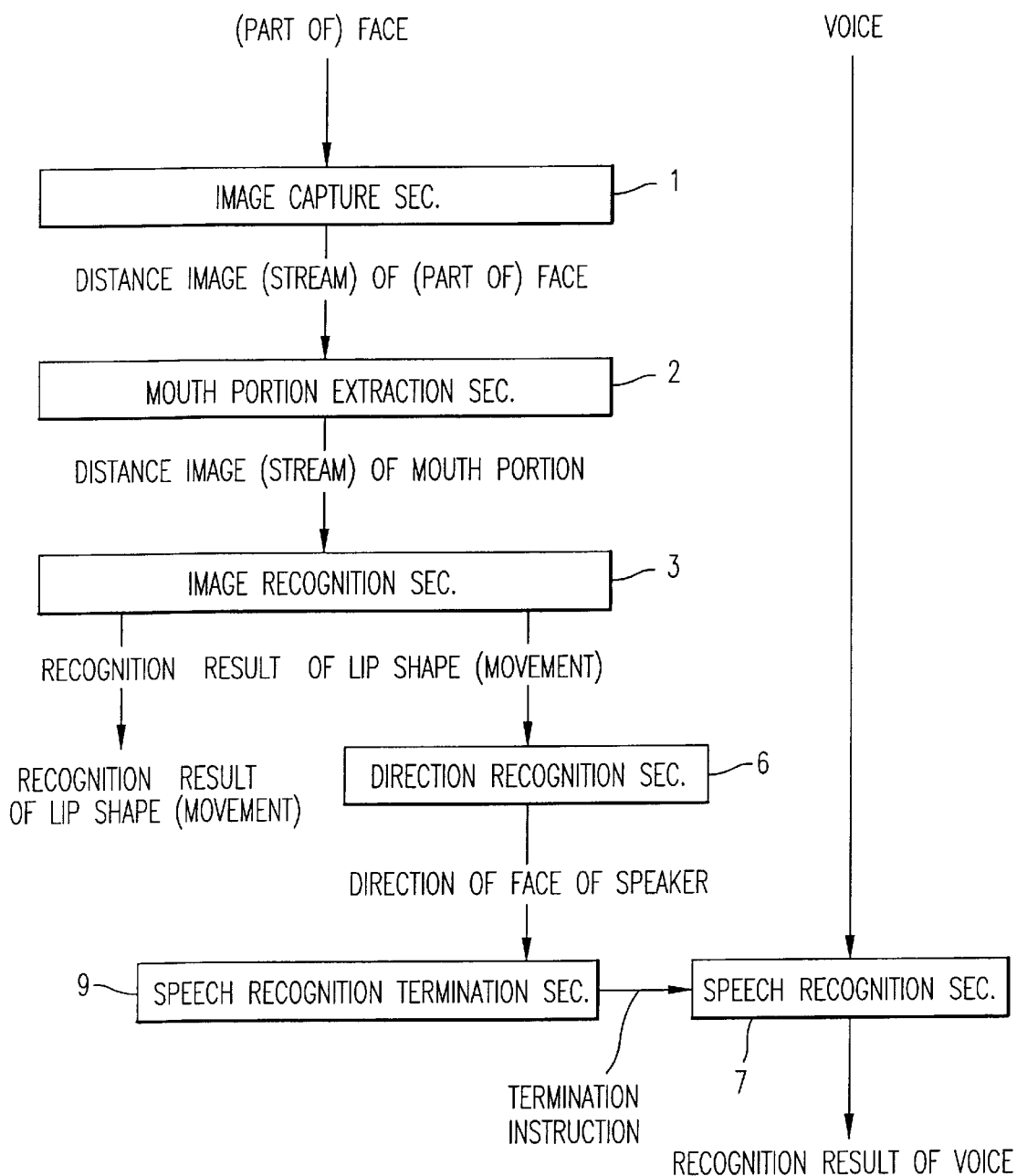
FIG. 16 is a block diagram of an image recognition apparatus according to a modification of the third embodiment of the invention.

As shown in FIG. 16, the speech recognition start section 8 may be replaced by a speech recognition termination section 9 for instructing the speech recognition section 7 to terminate speech recognition.

This makes it possible to terminate speech recognition in response to an action of a speaker. For example, speech recognition can be terminated when a speaker turns his face away from the image recognition apparatus.

It goes without saying that the speech recognition termination section 9 may be added to the configuration of FIG. 15 to make it possible to give both instructions to start and terminate speech recognition.

THIRD MODIFICATION OF THIRD EMBODIMENT

Figure 17:
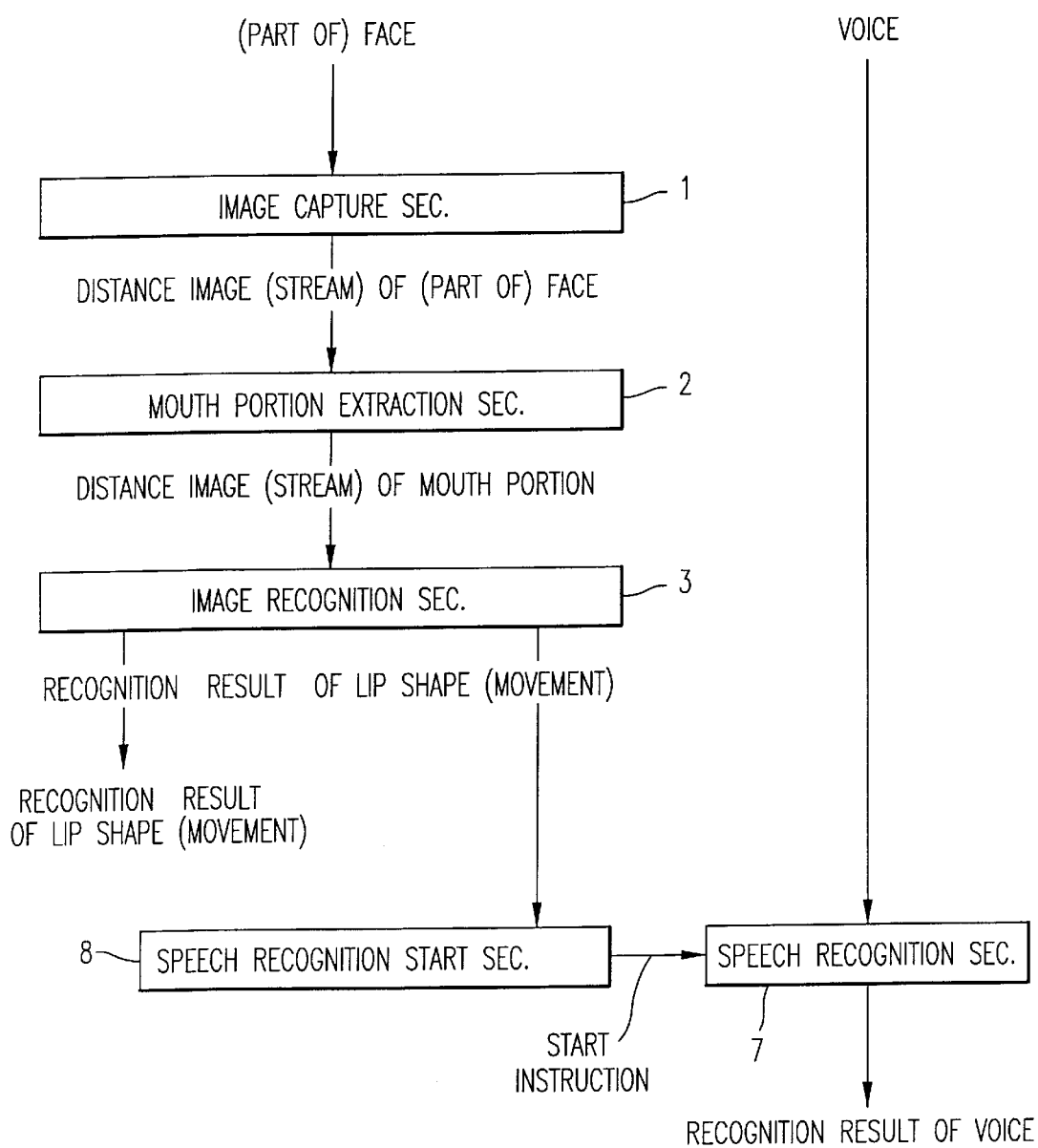
FIG. 17 is a block diagram of an image recognition apparatus according to another modification of the third embodiment of the invention.

As shown in FIG. 17, there may be provided a different version of speech recognition start section 8 for detecting the start of a lip action at the start of talking based on a recognition result of the image recognition section 3 and instructing the speech recognition section 7 to start speech recognition based on the detected start of the lip action.

In this case, the speech recognition start section 8 determines a time point when lips start to move based on a lip recognition result of the image recognition section 3, and instructs, at this time point, the speech recognition section 7 to start speech recognition.

The speech recognition start section 8 of this third modification may be replaced by a speech recognition termination section 9 for detecting a time point when a lip action is finished, to instruct the speech recognition section 7 to terminate speech recognition.

Naturally, a speech recognition termination section 9 for detecting a time point when a lip action is finished may be provided in addition to the speech recognition start section 8 of this third modification, to give both instructions to start and terminate speech recognition.

In the conventional methods, it is difficult to use detection of the start of a lip action in the above kind of real-time process because a calculation of the detection of a lip action takes time. In contrast, the image recognition apparatus of this embodiment can detect the start of a lip action satisfactorily on a real-time basis because a lip portion can be extracted at a low calculation cost as described in the first embodiment.

FOURTH EMBODIMENT

A fourth embodiment of an image recognition apparatus of the invention will be hereinafter described in regard to the block diagram of FIG. 18. The description of this embodiment will be centered on differences from the second embodiment.

Figure 18:
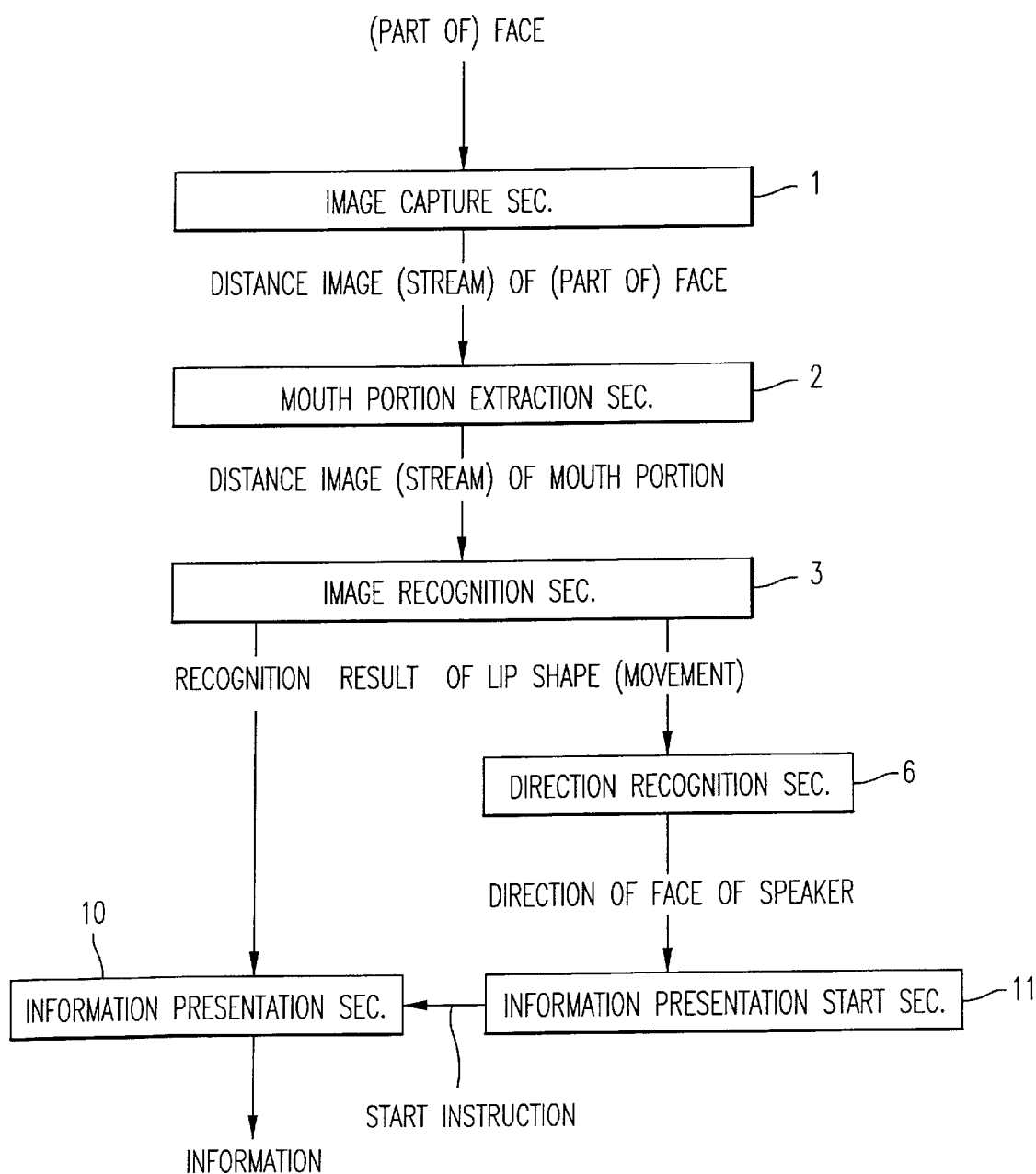
FIG. 18 is a block diagram of an image recognition apparatus according to a fourth embodiment of the invention.

As shown in FIG. 18, in the image recognition apparatus of this embodiment, an information presentation section 10 for presenting various kinds of information and an information presentation start section 11 for instructing the information presentation section 10 to start information presentation based on a direction of the face of a speaker that is obtained by the direction recognition section 6 are added to the configuration of the image recognition apparatus of the second embodiment. This makes it possible to present various kinds of information in accordance with the direction of the face of a speaker.

First, the information presentation section 10 will be described. The information presentation section 10 presents certain information to a speaker. The information presentation section 10 is provided with at least one of such information presentation devices as a display for presenting an image, a text, or the like, a speaker for presenting a sound, and a force feedback device that presents a feel, and can present information through the information presentation device.

Next, the information presentation start section 11 will be described. The information presentation start section 11 has the same kind of role as the speech recognition start section 8 of the third embodiment. That is, based on a recognition result of the direction recognition section 6, the information presentation start section 11 instructs the information presentation section 10 to start information presentation.

This embodiment makes it possible to start information presentation in response to an action of a speaker. For example, information presentation can be started when a speaker has turned to squarely face the image recognition apparatus (this is regarded as the start of an action of the speaker).

Since a result of lip recognition by the image recognition section 3 is also obtained, it is also possible to start information presentation in accordance with a speech content of a speaker.

Various modifications of the above embodiment are possible, several examples of which will be described below.

FIRST MODIFICATION OF FOURTH EMBODIMENT

As in the case of the second modification of the third embodiment, an information presentation termination section may be provided instead of or in addition to the information presentation start section 11, to instruct the information presentation section 10 to terminate information presentation.

SECOND MODIFICATION OF FOURTH EMBODIMENT

As in the case of the third modification of the third embodiment, there may be provided a different version of information presentation start section 11 for detecting the start of lip action at the start of talking based on a recognition result of the image recognition section 3 and instructing the information presentation section 10 to start information presentation based on the detected start of the lip action.

For example, by presenting a recognition content through speech composition (as an information presentation method) based on a recognition result of a lip shape or movement, this enables what is called lip synchronization. An example to the lip synchronization is such that the image recognition apparatus of this embodiment speaks through speech composition instead of a speaker who cannot speak owing to a throat disease or the like, when he merely moves his lips as if to speak actually.

As in the case of the third modification of the third embodiment, an information presentation termination section may be provided instead of or in addition to the information presentation start section 11, to instruct the information presentation section 10 to terminate information presentation.

THIRD MODIFICATION OF FOURTH EMBODIMENT

Figure 19:
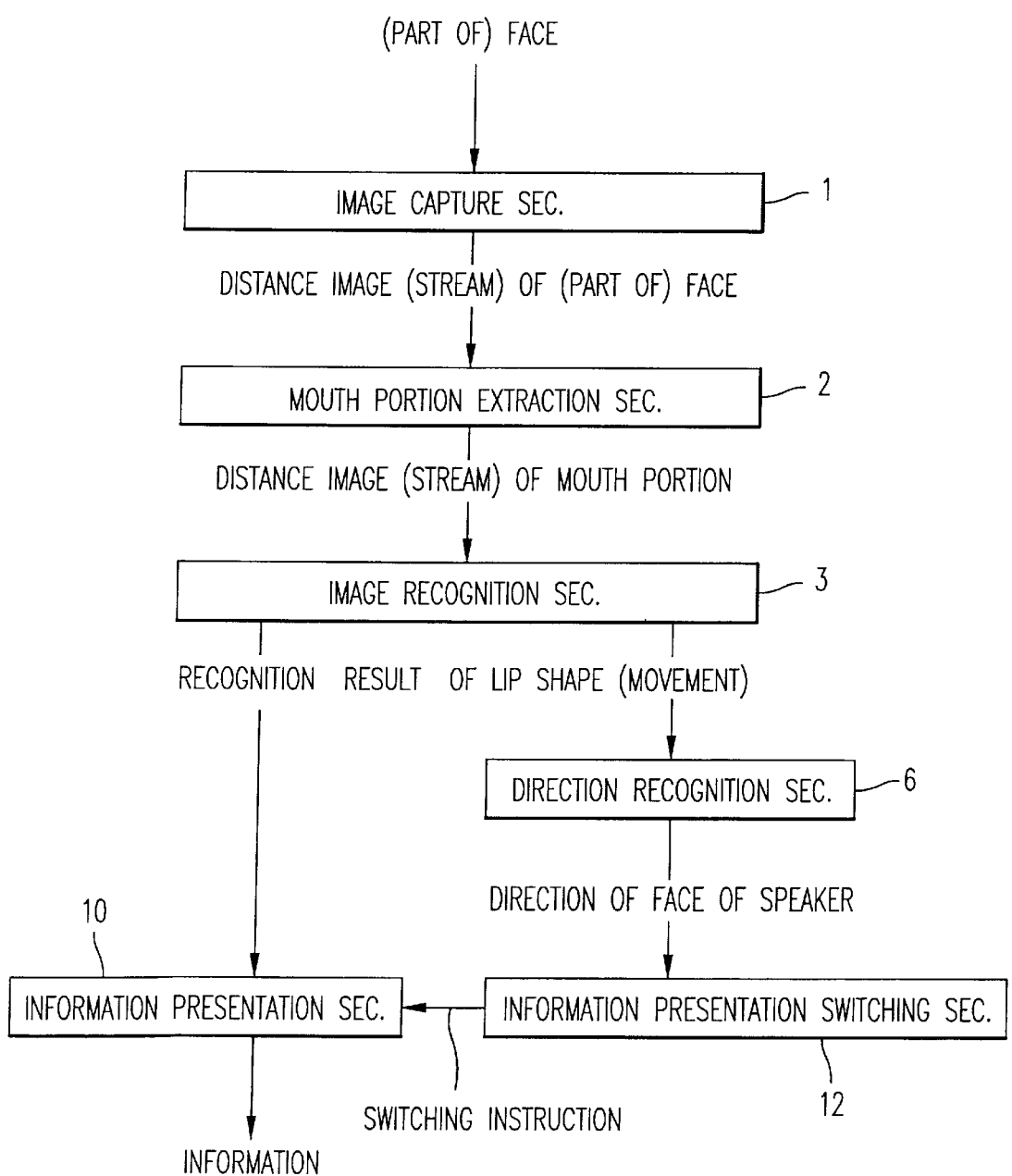
FIG. 19 is a block diagram of an image recognition apparatus according to a modification of the fourth embodiment of the invention.

As shown in FIG. 19, the information presentation start section 11 may be replaced by an information presentation switching section 12 for switching among plural kinds of information to be presented, to switch the information presentation mode in accordance with the direction to which a speaker is speaking.

Examples of the information presentation mode switching are:

(1) adding information presentation according to a different mode;

(2) stopping information presentation according to at least one mode when information is being presented according to a plurality of modes; and (3) changing part or all of modes to different ones when information is being presented according to one or a plurality of modes (including a case where the number of information presentation modes is changed).

This enables the following switching. When the face of a speaker is not directed to the image recognition apparatus, information presentation is performed by using only a voice. When the face of the speaker has turned to face the information recognition apparatus, the information presentation switching section 12 makes switching from the mode in which only a voice is used to a mode in which composite media such as a voice plus an image are used.

For example, this modification enables an explanation of an exhibit in a museum or an art gallery that is performed in the following manner. Usually, an explanation is presented in voice form. When a visitor looks at an exhibit or speaks something, an explanation video program starts to be displayed on a display device that is provided on the side of the exhibit.

FOURTH MODIFICATION OF FOURTH EMBODIMENT

Combining the speech recognition section 7, the speech recognition start section 8, the speech recognition termination section 9, etc. of the third embodiment (and its modifications) with the fourth embodiment makes it possible to present, in combination, a raw voice of a speaker and image information that is generated by the information presentation section 10.

For example, a three-dimensional CG image in which lips move in synchronism with a raw voice of a speaker (lip synchronization) can be presented by composing, as a three-dimensional CG image, a shape of a mouth portion by using a distance image stream of the mouth portion extracted by the mouth portion extraction section 2 and combining with it a raw voice of the speaker acquired by the speech recognition section 7.

FIFTH EMBODIMENT

An image recognition apparatus according to a fifth embodiment is such that a communication section (not shown) for communicating with external systems is added to the configuration of the image recognition apparatus according to any of the first to fourth embodiments and their modifications.

This makes it possible to transmit, to external systems, desired information that is obtained by the image recognition apparatus according to any of the first to fourth embodiments and their modifications.

The communication section is to transmit input data to an external system via a communication line such as a telephone line. For example, the addition of the communication section makes it possible to transmit, via a network, a result of lip recognition in the first embodiment, a result of lip recognition or a direction to which a speaker is speaking in the second embodiment, results of lip recognition and speech recognition in the third embodiment, or a result of lip recognition and presented information in the fourth embodiment.

For example, in the case of the fourth modification of the fourth embodiment, a three-dimensional CG image is obtained in which lips move in lip-synchronism with a raw voice of a speaker. It is possible to transmit the portions of a face other than a lip portion to a communication destination in advance and transmit only a lip portion of a three-dimensional CG image of the above kind on a real-time basis after the speaker starts speaking, whereupon the lip portion is combined, in the communication destination, with the other portions of the face that have already been sent there. In this manner, a three-dimensional CG image can be lip-synchronized without imposing an undue load on a communication line (i.e., without making a communication line a bottleneck). This is very effective in performing real-time processing by using relatively large data such as a voice and a CG image via, for example, the Internet where a speed-related bottleneck tends to occur in a communication line.

The configuration of the image capture section 1 used in each of the above embodiments will be hereinafter described in detail.

Figure 20:
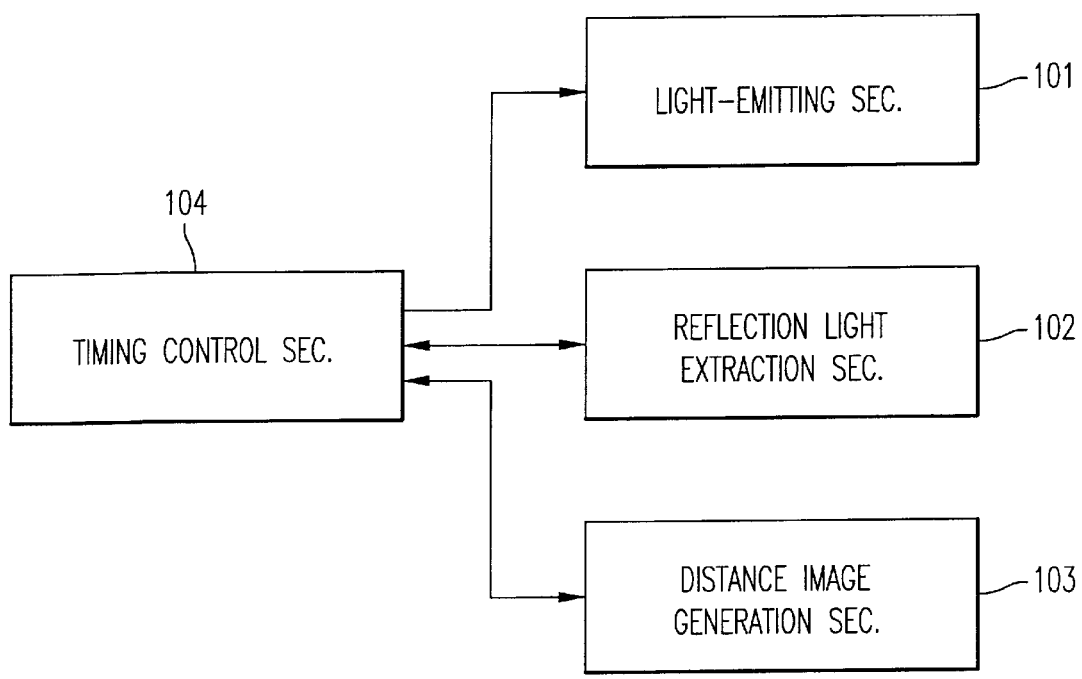
FIG. 20 shows an example configuration of an image capture section according to the invention.

FIG. 20 shows an example configuration of the image capture section 1. The image capture section 1 is composed of a light-emitting section 101 for illuminating an object body with light, a reflection light extraction section 102 for extracting, as an image, reflection light coming from the object body, a distance image generation section 103 for generating a distance image based on image-converted information of the reflection light, and timing control section 104 for controlling operation timing among the above sections.

Having a light-emitting device, the light-emitting section 101 emits light whose intensity varies over time in accordance with a timing signal that is generated by the timing control section 104. The light emitted from the light-emitting section 101 is reflected by an object body in front of the light-emitting device of the light-emitting section 101 and then enters the photodetecting surface of the reflection light extraction section 102.

Reflection light from a body steeply decreases as the distance of the body increases. Where the surface of a body reflects light uniformly, the reflection light quantity per one pixel of a reflection light image decreases in inverse proportion to the square of the distance to the body. Therefore, where a body exists in front of the photodetecting surface concerned, reflection light from the background decreases to such an extent as to be almost negligible and a reflection light image to which only the body contributes can be obtained.

For example, when a face portion of a human exists in front of the photodetecting surface concerned, a reference reflection light image of the face is obtained. In this case, each pixel value of a reflection light image represents the quantity of reflection light received by a unit photodetecting portion corresponding to the pixel. A reflection light image obtained when a face is an object body reflects a three-dimensional shape of the face, the distance of the face, the gradient of the face (the distance varies locally), etc.

Having photodetecting elements that are arranged in matrix form and detect the quantity of light, the reference reflection light extraction section 102 extracts a spatial intensity profile of reflection light that is produced by the object body through reflection of the light emitted by the light-emitting section 101. Since the spatial intensity profile of reflection light can be considered an image, it will be called a reflection light image in the following description.

In general, it is supposed that the photodetecting elements of the reflection light extraction section 102 not only receive reflection light produced by the object body through reflection of the light emitted by the light-emitting section 101 but also receive, at the same time, external light such as illumination light or sun light. In view of this, the reflection light extraction section 102 extracts only the component of reflection light produced by the object body through reflection of the light emitted by the light-emitting section 101 by taking a difference between the quantity of light received when the light-emitting section 101 is emitting light and the quantity of light received when the light-emitting section 101 is not emitting light. Such photodetection timing is also controlled by the timing control section 104.

Reflection light quantity values (analog signal) corresponding to the respective pixels of an external-light corrected reflection light image obtained by the reflection light extraction section 102 are amplified when necessary and then A/D-converted, whereby a digitized reflection light image is obtained.

The distance image generation section 103 generates a distance image (for example, 64×64 pixels and 256 gradation levels) by converting detection light quantity values (digital data) of the respective pixels of a reflection light image obtained by the reflection light extraction section 102 to distance values.

Figure 21:
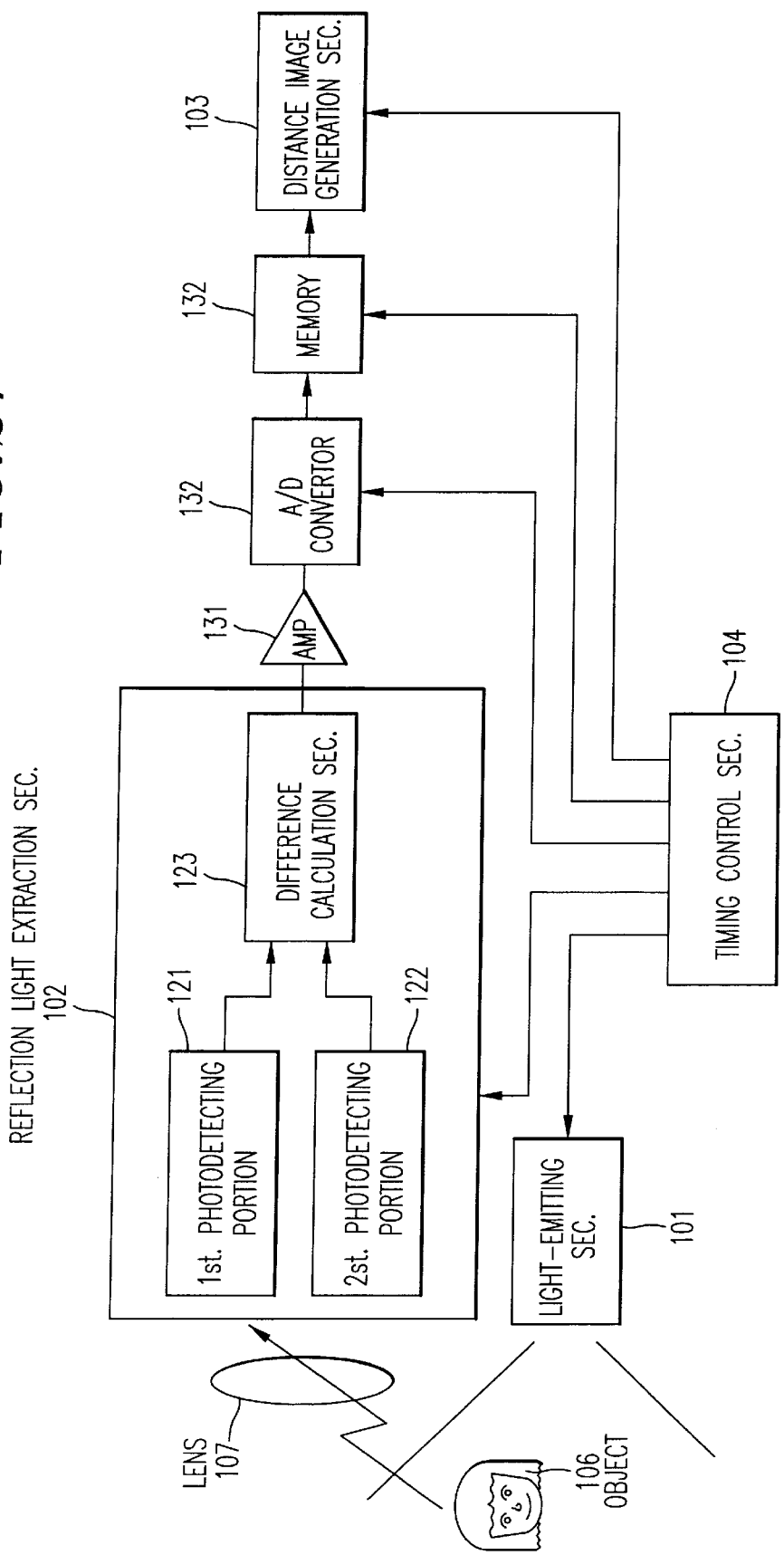
FIG. 21 shows a more detailed configuration of the image capture section according to the invention.

FIG. 21 shows a more detailed configuration of the image capture section 1. The light emitted by the light-emitting section 101 is reflected by an object body 106 and then imaged on the photodetecting surface of the reflection light extraction section 102 by a lens 107.

The reflection light extraction section 102 detects an intensity profile of reflection light, that is, a reflection light image. The reflection light extraction section 102 is composed of first and second photodetecting portions 121 and 122 that are provided for the respective pixels (respective unit photodetecting portions) and a difference calculation section 123 provided for all pixels (or for a set of pixels or for each pixel).

The first photodetecting portions 121 and the second photodetecting portions 122 perform photodetection with a deviation in timing. The timing control section 104 controls the operation timing of the first and second photodetecting portions 121 and 122 so that the light-emitting section 101 emits light while the first photodetecting portions 121 are receiving light, and does not emit light while the second photodetecting portions 121 are receiving light. As a result, the first photodetecting portions 121 receive reflection light produced by the body 106 through reflection of the light emitted by the light-emitting Section 101 as well as external light such as sun light or illumination light. On the other hand, the second photodetecting portions 122 receive only external light. Since the first and second photodetecting portions 121 and 122 receive light with only a small deviation in timing, variations in external light and a displacement of the object body 106 during such a small period can be disregarded.

Therefore, only the component of reflection light produced by the object body 106 can be extracted by taking a difference between an image received by the first photodetecting portions 121 and an image received by the second photodetecting portions 122. Where a single difference calculation section 123 is shared by a plurality of pixels, differences are calculated sequentially.

Each first photodetecting portion 121 and each second photodetecting portion 122 (each unit photodetecting portion) may actually be configured in various manners. For example, there may be conceived a configuration in which instead of providing a photodetecting element for each of the first photodetecting portion 121 and the second photodetecting portion 122, one photoelectric conversion element (e.g., a photodiode) is provided for each unit photodetecting portion so as to be shared by the first photodetecting portion 121 and the second photodetecting portion 122 and two charge storage elements (e.g., capacitors) for storing charge of an amount corresponding to a detection light quantity are provided for the first photodetecting portion 121 and the second photodetecting portion 122, respectively.

In the above manner, the reflection light extraction section 102 outputs reflection light quantity values of the respective pixels of a reflection light image after performing the external light correction. It is assumed here that reflection light quantity values of the respective pixels are output sequentially.

The output of the reflection light extraction section 102 is amplified by an amplifier 131, converted into digital data by an A/D converter 132, and then stored in a memory 133 as image data. The data stored in the memory 133 is read out with predetermined timing and supplied to the distance image generation section 103.

The distance image generation section 103 generates a distance image based on the reflection light image obtained by the reflection light extraction section 102. For example, reflection light quantity values of the respective pixels of the reflection light image are converted to respective digital data of a predetermined gradation levels (e.g., 256 gradation levels).

Where a three-dimensional shape of a face is to be extracted, it is desirable that distance information be determined at a high resolution. In this case, it is desirable that the amplifier 131 be logarithmic amplifier. Although the detection light quantity at the photodetecting surface is in inverse proportion to the square of the distance to an object body, an output of a logarithmic amplifier is in proportion to the distance. This enables of effective use of the dynamic range.

In the above configuration, assume that reflection light for all pixels is obtained by a single light emission. A single distance image is obtained by executing, under the control of the timing control section 104, a series of steps in the following order:

(1) light emission,
(2) photodetection by first photodetecting portions,
(3) photodetection by second photodetecting portions without light emission,
(4) difference calculation,
(5) digitization, and
(6) distance image generation or photodetection by second photodetecting portions without light emission,
(7) light emission,
(8) photodetection by first photodetecting portions,
(9) difference calculation,
(10) digitization,
(11) distance image generation.

A distance image stream can be obtained by repeating the above series of steps (e.g., every ⅟₆₀sec).

It is preferable that the light-emitting section 101 emits near infrared light which is invisible to the human eyes. This prevents a human from being dazzled even if he receives light emitted by the light-emitting section 101, because the light is invisible to him. In this case, it is preferable that the lens 107 be provided with a near infrared transmission filter. Since this filter transmits near infrared light that is emitted by the light-emitting section 101 while stopping visible light and far infrared light, it becomes possible to cut out most of the external light.

Visible light may be used under the condition that it does not dazzle human eyes (for example, the emission light quantity is not large, or the optical system is so designed as to prevent direct entrance of light to human eyes). It is also possible to use electromagnetic waves or ultrasonic waves.

Although the above description is directed to the case where a difference is taken between two kinds of detection light quantity values (with and without light emission of the light-emitting section 101) in analog signal states to perform external light correction, a difference may be taken after the two kinds of detection light quantity values have been digitized.

The above-mentioned photodetecting surface or a chassis accommodating it may be disposed properly so as to meet the purpose etc. of the image recognition apparatus of the invention. For example, where the image recognition apparatus has a display device, the chassis of the image recognition apparatus is so disposed that the face of a human as an object body is squarely opposed to the photodetecting surface when it is squarely opposed to the display device.

The above-described embodiments and their modifications can be combined with each other properly.

Although the image recognition apparatuses according to the embodiments, their modifications, and proper combinations thereof are directed to a case where a shape and/or a movement is recognized from a distance image stream (and various kinds of processing are then performed based on a recognition result), it is possible to recognize a shape from a distance image (and then perform various kinds of processing based on a recognition result).

The image recognition apparatuses according to the embodiments, their modifications, and proper combinations thereof may be modified in such a manner that the image capture section 1 or its portion for extracting a reflection light image is omitted and a shape and/or a movement is recognized based on a given distance image or distance image stream or based on a distance image or a distance image stream generated from a given reflection light image or reflection light image stream (and various kinds of processing are then performed based on a recognition result).

Each of the above-described functions can also be realized as software except the hardware device portions. Further, the invention can be implemented as a machine-readable medium on which a program for causing a computer to execute the above-described procedure or allow the above-described means to operate.

Obviously, numerous modifications and variations of the present invention are possible in light of the above teachings. It is therefore to be understood that within the scope of the appended claims, the invention may be practiced otherwise than as specifically described herein.

This application is based on Japanese Patent Application No. P10-019871 filed in the Japanese Patent Office on Jan. 30, 1998, the entire contents of which are hereby incorporated by reference.

What is claimed as new and desired to be secured by the Letters Patent of the United States is:

1. An image recognition apparatus comprising:
   an image capturing device which captures a distance image having a depth value that represents a three-dimensional shape of an object;
   a mouth portion extracting mechanism configured to extract a mouth portion from the distance image captured by the image capturing device;
   an image recognizing mechanism configured to recognize a lip shape based on a mouth portion distance image extracted by the mouth portion extracting mechanism;
   a direction recognizing mechanism configured to recognize a direction of a face of a speaker based on the mouth shape obtained by the image recognition mechanism;
   a speech recognizing mechanism configured to recognize an input voice; and
   a control mechanism configured to perform at least one of a control of causing the speech recognizing mechanism to start speech recognition when a recognition results of the direction recognizing mechanism is a square direction and a control of causing the speech recognizing mechanism to terminate speech recognition based on a recognition result of the direction recognizing mechanism.

2. An image recognition apparatus comprising:
   image capturing device which captures a distance image stream having a depth value represents a three-dimensional shape of an object;

a mouth portion extracting mechanism configured to extract a mouth portion from the distance image stream captured by the image capturing device;

an image recognizing mechanism configured to recognize a lip movement based on a mouth portion distance image stream extracted by the mouth portion extracting mechanism;

a direction recognizing mechanism configured to recognize a direction of a face of a speaker based on the mouth movement obtained by the image recognition mechanism;

a speech recognizing mechanism configured to recognize an input voice; and a control mechanism configured to perform at least one of a control of causing the speech recognizing mechanism to start speech recognition when a recognition results of the direction recognizing mechanism is a square direction and a control of causing the speech recognizing mechanism to terminate speech recognition when a recognition result of the direction recognizing mechanism is not a square direction.

* * * * *